(12) United States Patent
Vass et al.

(10) Patent No.: US 8,700,227 B2
(45) Date of Patent: Apr. 15, 2014

(54) ROOM THERMAL COMFORT MONITOR

(75) Inventors: Jiri Vass, Prague (CZ); Jiri Rojicek, Prague (CZ); Greg Bernhardt, Prague (CZ); Conrad Bruce Beaulieu, Duluth, MN (US)

(73) Assignee: Honeywell International Inc., Morristown, NJ (US)

( * ) Notice: Subject to any disclaimer, the term of this patent is extended or adjusted under 35 U.S.C. 154(b) by 286 days.

(21) Appl. No.: 13/046,456

(22) Filed: Mar. 11, 2011

(65) Prior Publication Data

US 2012/0232715 A1  Sep. 13, 2012

(51) Int. Cl.
*G05D 23/00* (2006.01)

(52) U.S. Cl.
USPC ............................ 700/300; 700/276; 700/291

(58) Field of Classification Search
USPC .......................... 700/276–278, 291, 299–300
See application file for complete search history.

(56) References Cited

U.S. PATENT DOCUMENTS

| | | | | |
|---|---|---|---|---|
| 2,142,593 A | * | 1/1939 | Woodling | 165/223 |
| 4,227,645 A | | 10/1980 | de La Farge et al. | |
| 4,873,649 A | * | 10/1989 | Grald et al. | 700/276 |
| 5,058,388 A | * | 10/1991 | Shaw et al. | 62/93 |
| 5,170,935 A | * | 12/1992 | Federspiel et al. | 236/44 C |
| 5,516,041 A | * | 5/1996 | Davis et al. | 236/49.3 |
| 8,005,655 B2 | * | 8/2011 | Baker et al. | 703/6 |

OTHER PUBLICATIONS http://www.healthyheating.com/solutions.htm, Healthy Heating, "Discussion on the Thermal Comfort Calculator," 2 pages, printed prior to Mar. 11, 2011.
Advanced Environmental Concepts Pty Ltd, "Adaptive Thermal Comfort Report," Melbourne City Council, pp. 1-10, Mar. 24, 2003.
U.S. Appl. No. 13/046,494, 53 pages, filed on Mar. 11, 2011.

* cited by examiner

*Primary Examiner* — Carlos Ortiz Rodriguez
(74) *Attorney, Agent, or Firm* — Seager Tufte & Wickhem LLC.

(57) ABSTRACT

A system for monitoring thermal comfort of a room. Sensor data concerning temperature, relative humidity, air speed and air flow may be collected from the room. The sensor data may provide thermal comfort level information about the room. The level information may be quantified in terms of a thermal comfort level index, such as a predicted mean vote, which can be used to identify one or more thermal comfort levels in the room with a numerical measure. The one or more levels may be portrayed as a visualization in terms of a 3D plot of temperature, humidity and air speed, several 2D plots, a dashboard, or other items. The visualization may easily enable one to see where setpoint adjustment is possible in a heating, ventilation and air conditioning system to save energy while maintaining thermal comfort acceptable to occupants in the room, whether during a heating season or a cooling season.

17 Claims, 25 Drawing Sheets

| PMV | % of dissatisfied |
|---|---|
| 0 | 5% |
| 0.5 | 10.2% |
| 0.84 | 19.9% |
| 0.9 | 22.1% |
| 1 | 26.1% |

*Figure 2*

| | Name of the Comfort Category | Rule for the Comfort Category | Example color for the Comfort Category |
|---|---|---|---|
| 126a → | Too cold (comfort violated) | • If $TCI < T_{low}$, then Comfort Category is "Too cold (comfort violated)". | Blue |
| 126b → | Luxury cool (cooling savings opportunity) | • If season is *cooling season* and $TCI \geq T_{low}$ and $TCI < T_{OK}$, then Comfort Category is "Luxury cool (cooling savings opportunity)". | Cyan |
| 126c → | Comfort OK | • If season is *cooling season* and $TCI \geq T_{OK}$ and $TCI \leq T_{high}$, then Comfort Category is "Comfort OK".<br>• If season is *heating season* and $TCI \geq T_{low}$ and $TCI \leq T_{OK}$, then Comfort Category is "Comfort OK". | Green |
| 126d → | Luxury warm (heating savings opportunity) | • If season is *heating season* and $TCI > T_{OK}$ and $TCI \leq T_{high}$, then Comfort Category is "Luxury warm (heating savings opportunity)". | Orange |
| 126e → | Too hot (comfort violated) | • If $TCI > T_{high}$, then Comfort Category is "Too hot (comfort violated)". | Red |

ROOM THERMAL COMFORT MONITOR

BACKGROUND

The present disclosure pertains to heating, ventilation and air conditioning (HVAC) of a space such as a room. The disclosure particularly pertains to a monitoring of thermal comfort in the space so that appropriate adjustments may be made to heating, ventilation and air conditioning to maintain thermal comfort in the space acceptable to its occupants.

SUMMARY

The disclosure reveals a system for monitoring thermal comfort of a room. Sensor data concerning temperature, relative humidity, air speed and air flow may be collected from the room. The sensor data may provide thermal comfort level information about the room. The thermal comfort level information may be quantified in terms of a thermal comfort index (TCI), such as a predicted mean vote (PMV), which can be used to identify one or more thermal comfort levels in the room with a numerical measure. The one or more comfort levels may be portrayed as a visualization in terms of a 3D plot of temperature, humidity and air speed, a number of 2D plots, a dashboard, or other items. The visualization may easily enable one to see where setpoint adjustment is possible in a heating, ventilation and air conditioning (HVAC) system to save energy while maintaining thermal comfort acceptable to occupants in the room, whether during a heating season or a cooling season.

BRIEF DESCRIPTION OF THE DRAWING

FIG. 2 is a diagram of a table showing a predicted mean vote of various values of thermal comfort level and percentages of people dissatisfied, respectively, with each shown value of thermal comfort level;

FIG. 5b is an example chart showing various room or zone thermal comfort level descriptions correlated with having color coding;

DESCRIPTION

Figure 1:
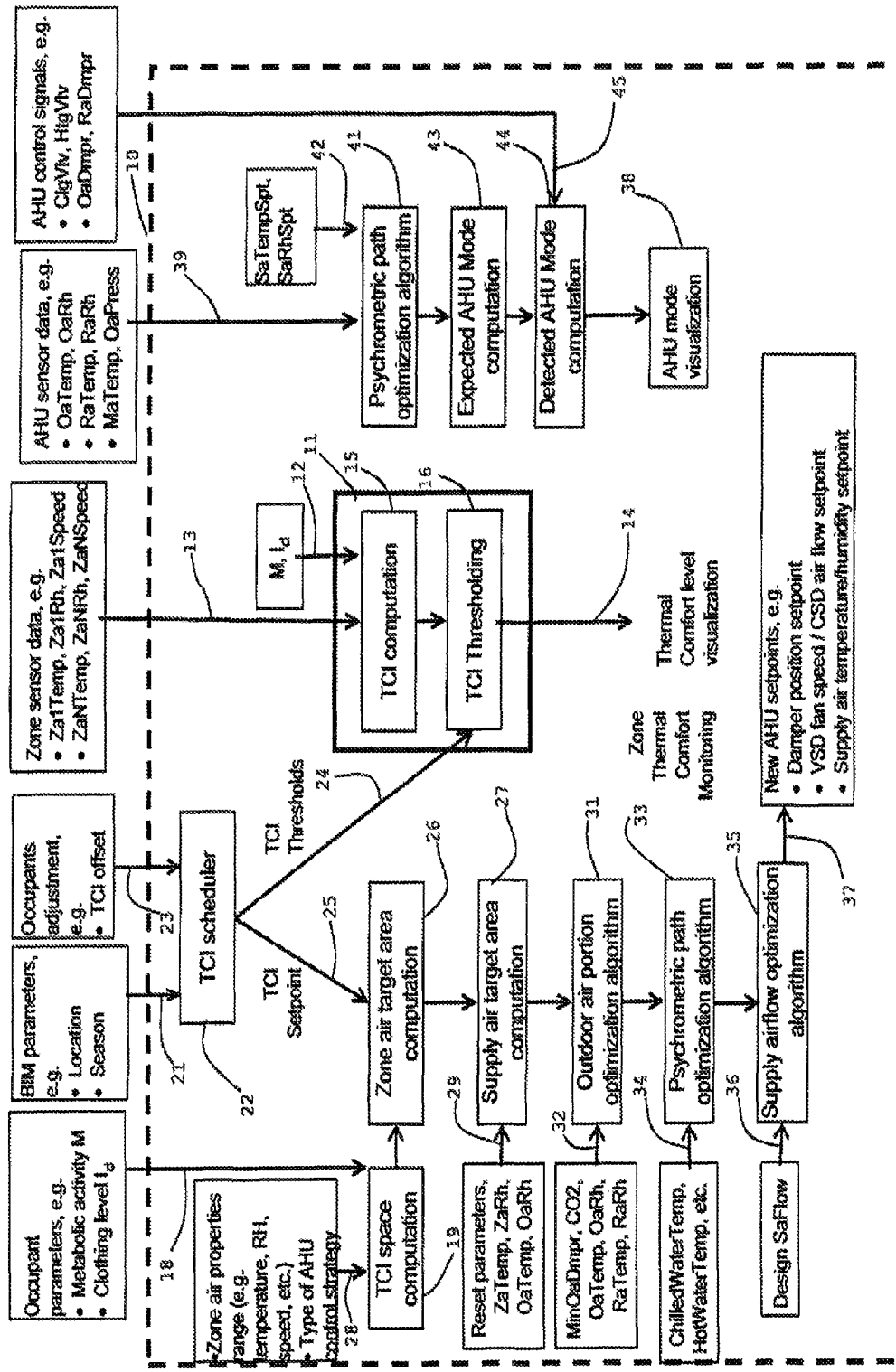
FIG. 1 is a diagram of a high-level approach for a thermal comfort level monitor in a context of an air handling unit (AHU) control.

The present application is related to U.S. patent application Ser. No. 13/046,494, filed Mar. 11, 2011 and entitled "Setpoint Optimization for Air Handling Units", which is hereby incorporated by reference.

Traditionally, the thermal comfort level in a room (zone) may be used for controlling an HVAC system only. This means that the requested thermal comfort may be defined by a facility manager and/or occupants, and be used as a setpoint for the HVAC system.

When reference is made to "comfort" herein, the term means "thermal comfort", not other types of comfort, such as visual comfort (e.g., sufficient room illumination), air quality comfort (e.g., acceptable $CO_2$ concentration), and so on.

However, the actual thermal comfort level in a room (or zone) is not usually further monitored, neither for detecting possible adjustments of HVAC operation nor for analyzing and reporting the actual thermal comfort level, i.e., one at an occupant's satisfaction. Since the acceptable thermal comfort level may be typically achieved by various combinations of virtually all factors influencing the thermal comfort level (e.g., temperature, humidity, air speed, and so forth), such monitoring could be helpful in finding better setpoints for HVAC control. "Better" may mean setpoints which can be achieved with less energy (i.e., less expensive) while the requested thermal comfort level is still met. The thermal comfort level monitoring may also help to identify if and when the requested thermal comfort is not met, and correlate these situations with other collected data (like a time of day, weather, and so on) to analyze the root cause of such situations (e.g., an unmet requested thermal comfort level).

A thermal comfort level may typically be defined by the zone temperature only. But herein, one may take into account other comfort-related factors for defining a thermal comfort level. One may adopt a PMV (predicted mean vote) as an advanced indicator of a room thermal comfort level. The PMV may be regarded as one kind of an example thermal comfort index for enumerating comfort levels. The present disclosure is not necessarily linked to any specific thermal comfort index.

The disclosure may use a suitable visualization of a current thermal comfort level and virtually all of its acceptable values (for an acceptable thermal comfort space). Two types of thermal comfort visualizations may be distinguished. The first type may be a current thermal comfort visualization (type A) and the second type may be a long-term thermal comfort visualization (type B).

The current comfort visualization (type A) may allow a comparison of the currently observed comfort level with its acceptable comfort space (such as a PMV space). Such a tool may provide an intuitive picture indicating whether the actual comfort is satisfied or violated, and also indicate whether there are any savings opportunities (e.g., during cooling season, the actual comfort index may be acceptable but lower than necessary in that it is unnecessarily cold). Increasing the thermal comfort index (typically temperature) would not necessarily violate the thermal comfort level but may lead to energy savings (by using less cooling energy).

The long-term thermal comfort visualization (type B) may allow one to observe the actual versus expected comfort over a period of time. This type of visualization may be a chart that provides a long-term comparison of an observed comfort level and its acceptable comfort space. Any comfort violations and/or saving opportunities may be correlated with other observed variables (e.g., AHU mode, weather, time of day, and so on) for a detailed root cause analysis.

The noted visualizations may be made more informative with suitable color coding to indicate: 1) comfort violated, too cold; 2) comfort ok, but unnecessary heating observed; 3) comfort ok; 4) comfort ok, but unnecessary cooling observed; and 5) comfort violated, too hot.

To use the present approach, a required thermal comfort level should be defined by some thermal comfort level index, for example, such as the PMV. This defining may typically be done by either a facility manager or occupants of the space with the thermal comfort level. Then virtually all relevant comfort-related data should be collected. The current thermal comfort level should be evaluated in view of the data. Visualizations may then be used for online reporting tools and reports. Online reporting tools may be like dashboards. Dashboards may immediately indicate, for example, if and how an HVAC operation should be adjusted. The reports may summarize the HVAC operation over a significant period of time. The approach may be helpful for providing a detailed analysis of any observed comfort violations and/or energy saving opportunities.

A computer/controller (computer) 40 may enable or be a part of a portion or a whole of the room thermal comfort monitor system and approach disclosed herein. Computer 40 may incorporate one or more inputs, a processor, a user interface with a keyboard and display, a memory, external connections such as an internet, one or more outputs, and so forth. Computer 40 may be utilized or associated with virtually any item shown in and/or pertinent to FIGS. 1-24 and the present disclosure.

FIG. 1 is a diagram of a high-level approach for a thermal comfort monitor. The zone monitor portion is shown within symbol 11. Symbol 11 may be within a symbol 10 which incorporates an AHU control and monitor. An input 12 may incorporate M (metabolic activity) and $I_{cl}$ (clothing level) which are occupant parameters. Also incorporated are zone sensor data such as Za1Temp, Za1Rh and Za1Speed (air temperature, air relative humidity and air speed, respectively, from zone number 1), ZaNTemp, ZaNRh and ZaNSpeed (air temperature, air relative humidity and air speed, respectively, from zone number N) at an input 13. An output 14 from symbol 11 may be a thermal comfort level visualization.

Within symbol 11, the zone sensor data may go to a TCI (thermal comfort index) computation at symbol 15. A computed TCI may go to a TCI thresholding at symbol 16. Then the output of symbol 16 may be the output 14 of the zone thermal comfort monitor portion of symbol 11.

Another portion of AHU control may have occupant parameters (M and $I_{cl}$) as an input 18 to TCI space computation represented by symbol 19. A range of zone air properties (air temperature, air relative humidity, and/or air speed), along with a type of AHU control strategy may be an input 28 to TCI space computation at symbol 19.

Building parameters such as building location and season of the year may be of an input 21 to a TCI scheduler at symbol 22. An occupant's adjustment such as a TCI offset may be an input 23 to the TCI scheduler. The TCI scheduler at symbol 22 may provide an output 24 of TCI thresholds to the TCI thresholding at symbol 16. A TCI setpoint output 25 may go to a zone air target area computation at symbol 26. Also an input from TCI space computation at symbol 19 may go to the zone air target area computation at symbol 26. An output from the zone air target area computation at symbol 26 may go as an input to supply air target area computation at symbol 27. An input 29, having reset parameters, ZaTemp (zone air temperature), ZaRh (zone air relative humidity), OaTemp (outdoor air temperature), OaRh (outdoor air relative humidity) and OaPress (outdoor air barometric pressure), may go to the supply air target area computation at symbol 27. An output from the supply air target area computation may go as an input to an outdoor air portion optimization algorithm at symbol 31. Also an input 32 of MinOaDmpr (minimum outdoor air damper position), $CO_2$ (carbon dioxide concentration), OaTemp, OaRh, RaTemp (return air temperature) and RaRh (return air relative humidity) may go to the outdoor air portion optimization algorithm. An output from outdoor air portion optimization algorithm at symbol 31 may go to a psychrometric path optimization algorithm at a symbol 33. A chilled water temperature, hot water temperature and so forth may go as an input 34 to the psychrometric path optimization algorithm. An output from psychrometric path optimization algorithm at symbol 33 may go to a supply airflow optimizer at symbol 35. An input 36 of a SaFlow dsgn (design supply air flow) may go to the supply airflow optimization algorithm. An output 37 from the optimization algorithm at symbol 35 may have new setpoints such as damper position setpoint, VSD (variable speed drive) fan speed setpoint, CSD (constant speed drive) air flow setpoint, supply air temperature setpoint and/or supply air relative humidity setpoint.

The zone thermal comfort monitor at symbol 11 in FIG. 1 may involve a thermal comfort level visualization. Various amounts or degrees of zone thermal comfort may be measured and labeled in accordance by an index quantitatively or qualitatively. Such an index may be regarded as thermal comfort index. Zone thermal comfort may be numerically quantified, for example, by using the PMV (predicted mean vote). The PMV may be equated to a thermal sensation index (which may be commonly adopted). The PMV or a similar index may be a number between −3 (very cold) and +3 (very hot). If the PMV is between −0.84 and +0.84, then about 80 percent of the people may be considered as being satisfied (per Chapter 8 "Thermal Comfort" from "ASHRAE Handbook—Fundamentals", 2005, American Society of Heating, Refrigerating and Air-Conditioning Engineers, Inc. (ASHRAE), ISBN 1-931862-71-0.) FIG. 2 is a table 47 showing a PMV of 0, 0.5, 0.84, 0.9 and 1 with the percentages of 5, 10.2, 19.9, 22.1 and 26.1 of people dissatisfied, respectively.

The PMV may be computed using six factors which incorporate air temperature, air relative humidity, air speed, mean radiant temperature, metabolic rate M and clothing level $I_{cl}$. Data points (sensor data) may incorporate air temperature, air relative humidity, air speed and mean radiant temperature. Parameters (depending on room type and season) may incorporate a metabolic rate M and clothing level $I_{cl}$.

Figure 3:
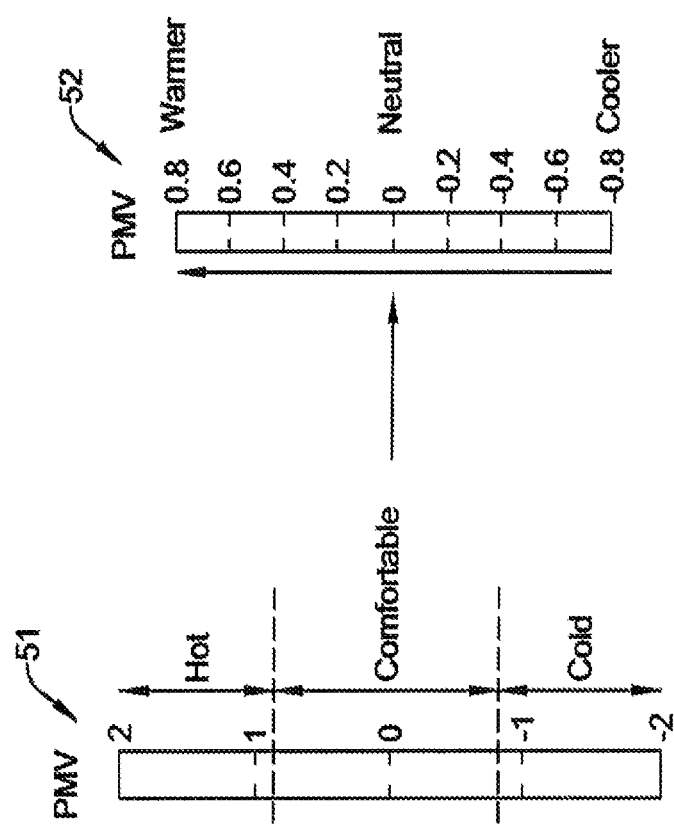
FIG. 3 is a diagram showing a predicted mean vote bar graph indicating numerical values for thermal comfort levels between hot and cold.

FIG. 3 is a diagram 51 showing the PMV of a range from +2 (hot) to −2 (cold). The comfortable range may be from −0.84 to +0.84. Diagram 52 of FIG. 3 is a zoomed-in view of the PMV comfortable range from 0.8 (warmer) to −0.8 (cooler). Zero may be regarded as neutral. Even when the PMV is inside the comfortable range, one may fine-tune the PMV value to save energy.

Zone thermal comfort monitor of symbol 11 in FIG. 1 may involve a visualization of current zone air properties in a PMV space (PMV space may be computed by symbol 19 of FIG. 1 since PMV space is a special case of TCI space. A user may see if some "setpoint adjustment" is possible to save energy. During the heating season, heating energy may be reduced by keeping the PMV as low as acceptable. Actual heating conditions should be kept in an area 55 of graph 54 of FIG. 4. During the cooling season, cooling energy may be reduced by keeping the PMV as high as acceptable. Actual cooling conditions should be kept in an area 56 of graph 54. Areas 55 and 56 may correspond to areas 57 and 58, respectively, on the PMV bar graph scale 52. Circle 61 may indicate current properties of zone air during, e.g. a cooling season. Graph 54 may be a multi-dimensional with PMV levels represented by varied shading or colors, and with air temperature, air speed (m/s) and air relative humidity on the various axes.

Graph 54 is an illustrative example visualization of the PMV space which may use various colors or shades to represent data points and parameters. The current thermal comfort level may be represented by the circle or dot 61. Graph 54 shows that thermal comfort is not necessarily violated (if the white dot is not in the black area) but the graph indicates that less cooling still would not necessarily compromise thermal comfort but save some energy. This situation may be present because the current air properties (i.e., dot 61) are not necessarily in a fringe area near the black (i.e., representing minimal possible cooling but still meeting an acceptable thermal comfort level). The same approach may apply to the heating season. Color coding in graph 54 may vary from one implementation to another of the zone thermal comfort monitoring. Another kind of visualization instead of a 3D plot of graph 54 may be used.

Zone thermal comfort categories noted herein may involve the cooling season versus the heating season. When reference is made to "comfort category" herein, the term means "zone thermal comfort level category". In the cooling season, if $TCI \geq T_{low}$ and $TCI < T_{OK}$, the comfort category is luxury cool (symbol 126b). The "luxury cool" category is not necessarily applicable to the heating season as shown in graph 65 of FIG. 5a. In the heating season, if $TCI > T_{OK}$ and $TCI \leq T_{high}$, the comfort category is luxury warm (symbol 126d). The "luxury warm" category is not necessarily applicable to the cooling season as shown in graph 64 of the Figure. The comfort may be acceptable when being of a slightly cool room so as to save on heating. The comfort may be acceptable when being of a slightly warm room so as to save on cooling. The inequality $T_{low} \leq T_{OK} \leq T_{high}$ virtually always holds. Numerical value of $T_{low}$ used during the cooling season may be different from $T_{low}$ used during the heating season. Numerical value of $T_{OK}$ used during the cooling season may be different from $T_{OK}$ used during the heating season. Numerical value of $T_{high}$ used during the cooling season may be different from $T_{high}$ used during the heating season. In versions of the present approach, just some of the comfort categories may be used; that is, not necessarily all four of them, but generally just two or three of them. Note that TCI thresholds (i.e., $T_{low}$, $T_{OK}$, $T_{high}$) may be computed by TCI scheduler 22 of FIG. 1 using inputs 21 and 23. The TCI thresholding 16 may utilize the TCI thresholds to determine the comfort categories 126a, 126b, 126c, 124d and 126e as indicated by chart 64 and chart 65 of FIG. 5a and table 125 of FIG. 5b.

FIG. 5b is a chart 125 showing various room or zone comfort level descriptions and their respective color coding. The color coding may be other than shown, as the present coding is meant to be an illustrative example. In the present example, too cold (comfort violated) 126a may be designated with blue, luxury cool (cooling savings opportunity) 126b with cyan, comfort OK 126c with green, luxury warm (heating savings opportunity) 126d with orange, and too hot (comfort violated) 126e with red.

As shown in FIG. 5b, the rules associated with the respective categories may incorporate: "If $TCI < T_{low}$, then the comfort category is "Too cold (comfort violated)" 126a; If season is cooling season and $TCI \geq T_{low}$ and $TCI < T_{OK}$, then the comfort category is "Luxury cool (cooling savings opportunity)" 126b; If season is cooling season and $TCI \geq T_{OK}$ and $TCI \leq T_{high}$, then the comfort category is "Comfort OK" 126c; If season is heating season and $TCI \geq T_{low}$ and $TCI \leq T_{OK}$, then the comfort category is "Comfort OK" 126c; If season is heating season and $TCI > T_{OK}$ and $TCI \leq T_{high}$, then the comfort category is "Luxury warm (heating savings opportunity)" 126d; and If $TCI > T_{high}$, then the comfort category is "Too hot (comfort violated)" 126e.

Figure 5A:
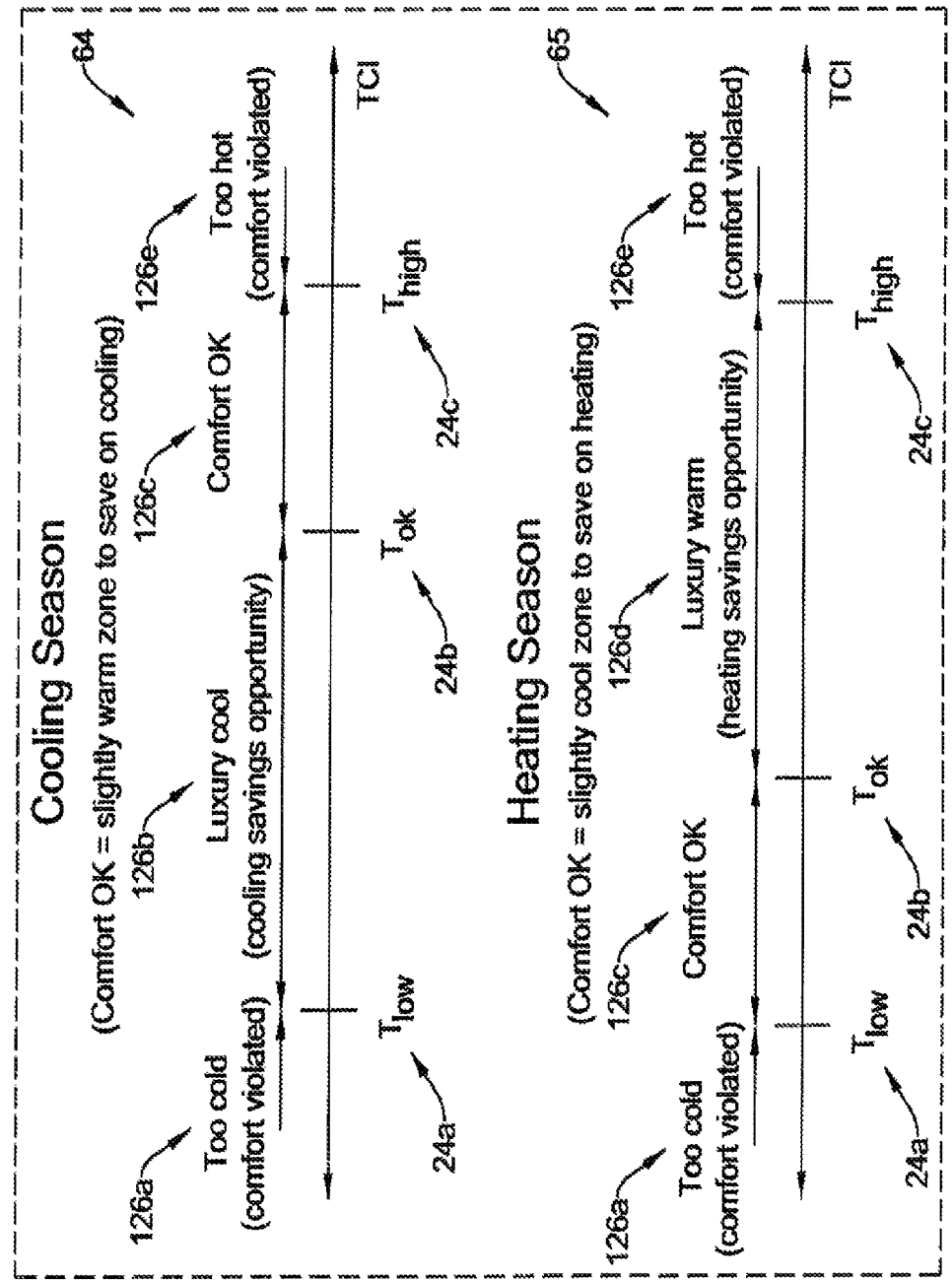
FIG. 5a is a diagram of thermal comfort level categories and thermal comfort index thresholds for the thermal comfort index for the cooling season and heating season.

Color coding from chart 125 of FIG. 5b may be used to indicate a comfort category in various types of visualizations (as an example, this color coding is used in FIGS. 5a, 7, 8, 9, 10, 15, 16, 19, 20 and 21 to indicate a comfort category).

Zone comfort monitoring may be done in two steps, for example, using PMV. First, the PMV may be computed from data at a current timestamp. Second, the PMV may be thresholded (i.e., the PMV is compared with PMV thresholds), as shown in table 62 of FIG. 6. The PMV threshold values 147 shown are merely illustrative examples. TCI threshold values may differ for various locations and/or seasons. PMV may be just an illustration of possible thermal comfort index; however, any other index may be used a similar way. Different thermal comfort indices may need different threshold values, but the basic approach is the same.

Figure 6:
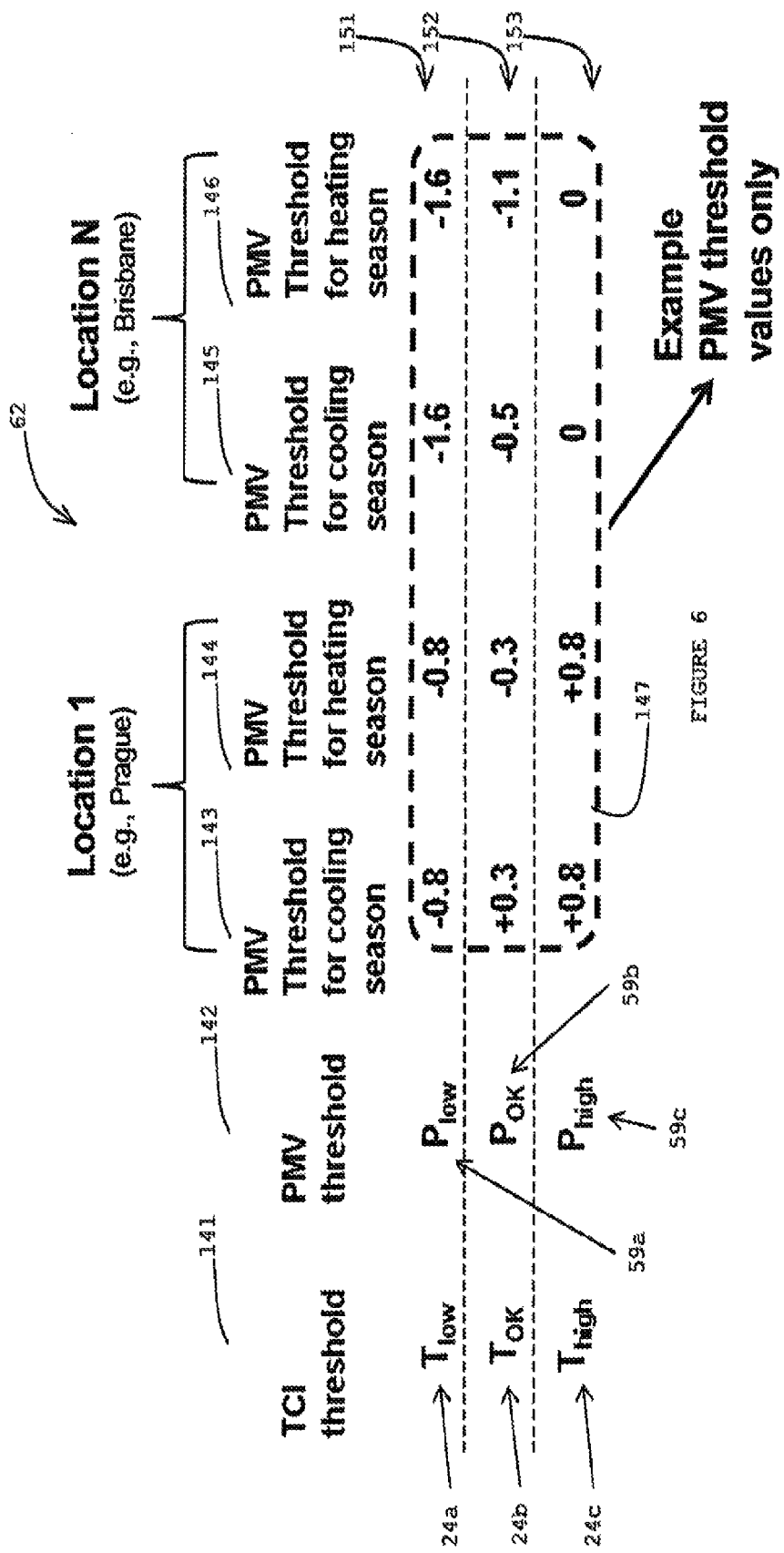
FIG. 6 is a table of thermal comfort index thresholds and predicted mean vote thresholds for cooling and heating seasons.

In table 62 of FIG. 6, TCI threshold 141, PMV threshold 142, PMV threshold 143 for cooling season at location 1, PMV threshold 144 for heating season at location 1, PMV threshold 145 for cooling season at location N and PMV threshold 146 for heating season at location N, may have labels and example values for each of three rows 151, 152 and 153, respectively, from left to right. Row 151 may have $T_{low}$ 24a, $P_{low}$ 59a, −0.8, −0.8, −1.6 and −1.6, respectively. Row 152 may have $T_{OK}$ 24b, $P_{OK}$ 59b, +0.3, −0.3, −0.5 and −1.1, respectively. Row 153 may have $T_{high}$ 24c, $P_{high}$ 59c, +0.8, +0.8, 0 and 0, respectively.

Figure 7:
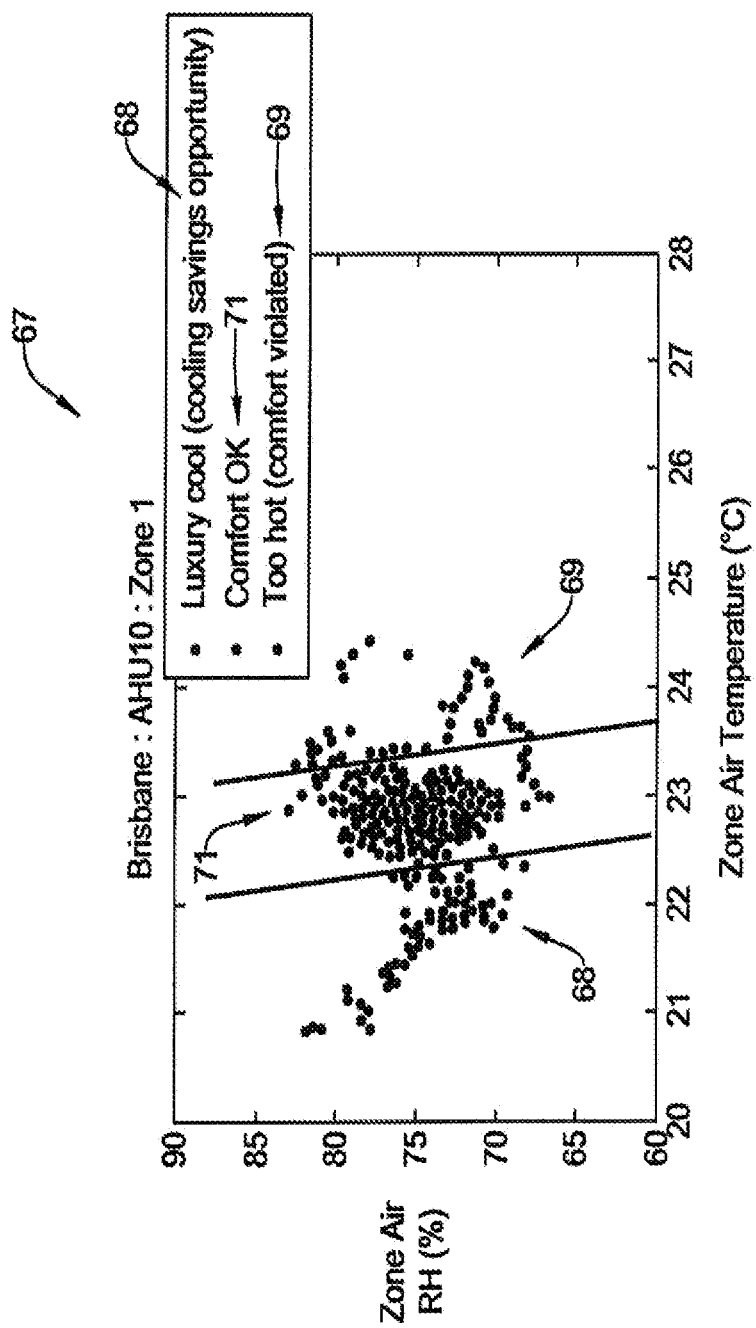
FIG. 7 is a diagram of an example plot of data points corresponding to several thermal comfort categories as indicated by thermal comfort boundaries indicating respective predicted mean vote values.

Graph 67 of FIG. 7 data points may be shown with color coding corresponding to the four comfort categories indicated in the graphs 64 and 65 of FIG. 5a. For the cooling season graph 64, the categories may be too cold (comfort violated), luxury cool (cooling savings opportunity), comfort OK, and too hot (comfort violated). For the heating season graph 65, the categories may be too cold (comfort violated), comfort OK, luxury warm (heating savings opportunity) and too hot (comfort violated).

A graph 67 in FIG. 7 for a location (e.g., Brisbane) of a particular AHU 10 for a zone 1 reveals for luxury cool (cooling savings opportunity) data 68, too hot (comfort violated) data 69 and comfort OK data 71. Graph 67 is shown with example data plotted as zone air relative humidity (percent) versus zone air temperature (degrees C.).

Figure 8:
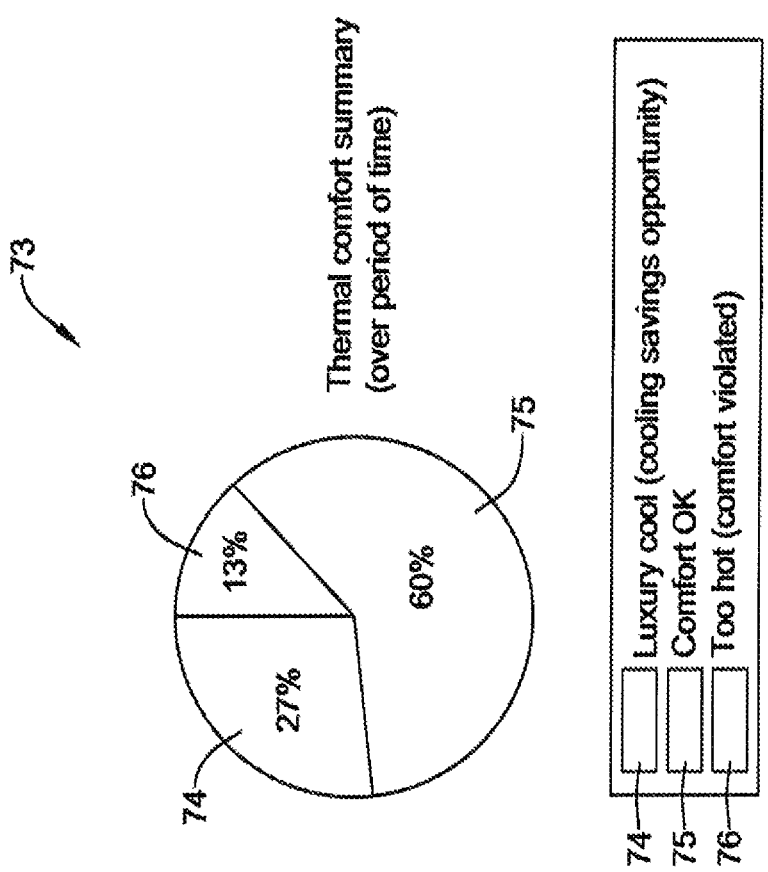
FIG. 8 is an illustrative pie graph example of a thermal comfort level visualization over a several month period of time.

FIG. 8 is a pie graph example of comfort level visualization over a several month period of time. Graph 73 shows a luxury cool (cooling savings opportunity) of 27 percent at a pie section 74, a comfort OK of 60 percent at a pie section 75, and too hot (comfort violated) of 13 percent at a pie section 76.

Figure 9:
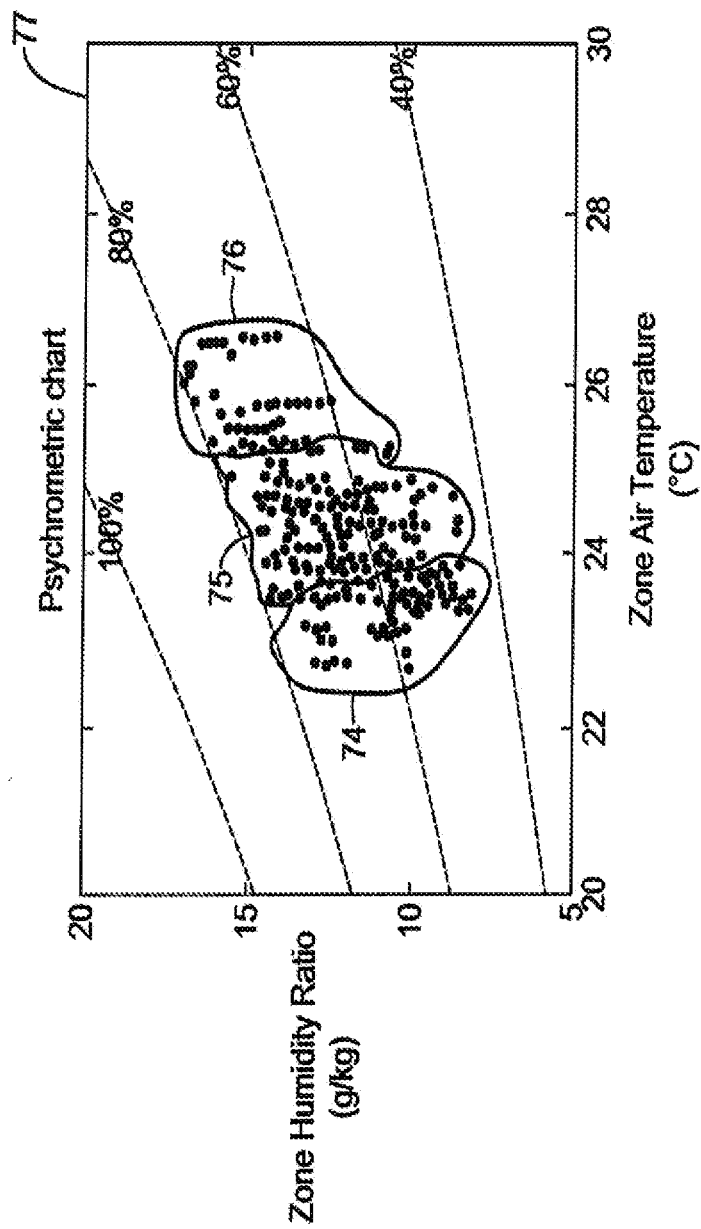
FIG. 9 is a graph of an example psychrometric chart that shows a zone humidity ratio versus zone air temperature for various thermal comfort levels.

FIG. 9 is a graph of a psychometric chart 77 that shows a zone humidity ratio ($kg_{water}/kg_{dry\ air}$) versus zone air temperature (degrees C.). The data plot of pie section 74 represents the luxury cool, the data plot of section 75 represents the comfort OK and the data plot of section 76 represents the too hot category.

Figure 10:
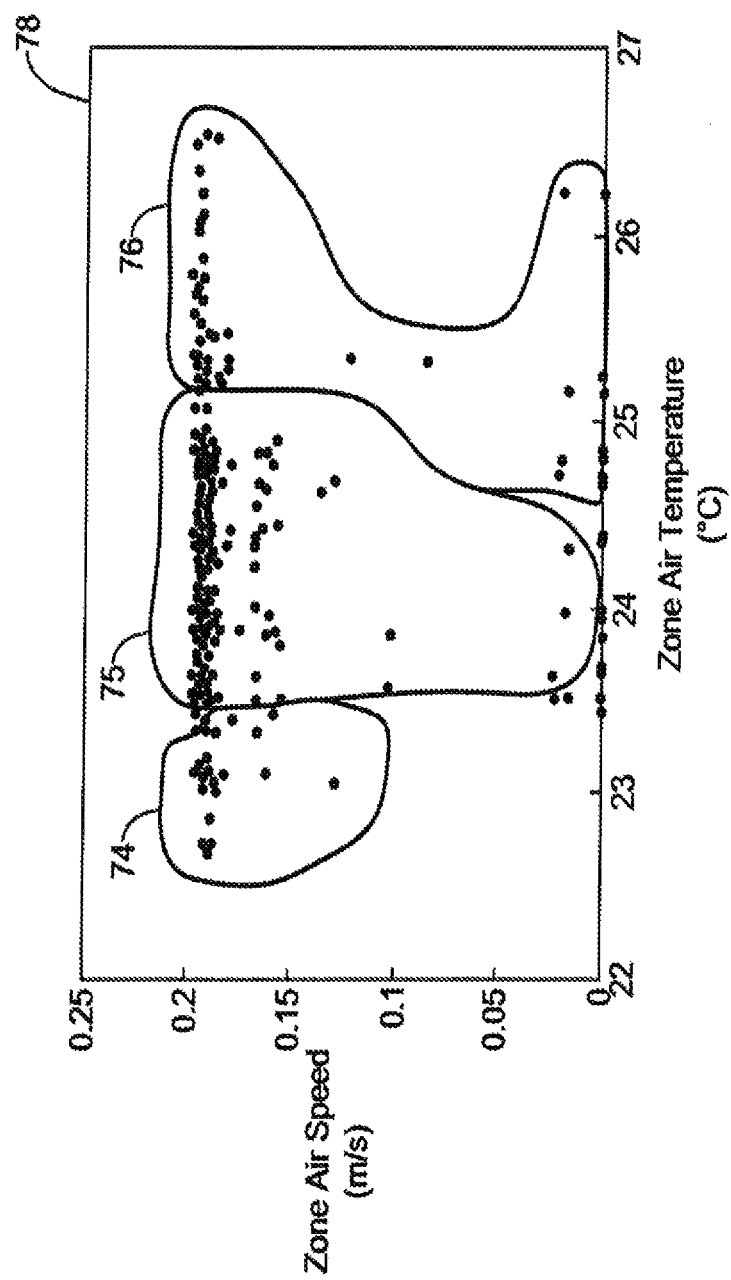
FIG. 10 is a graph of zone air speed versus zone air temperature for data plots of various thermal comfort levels.

FIG. 10 is a graph 78 of zone air speed (m/s) versus zone air temperature (degrees C.). The data plots of sections 74, 75 and 76 also represent the luxury cool, comfort OK and the too hot categories, respectively.

Figure 11:
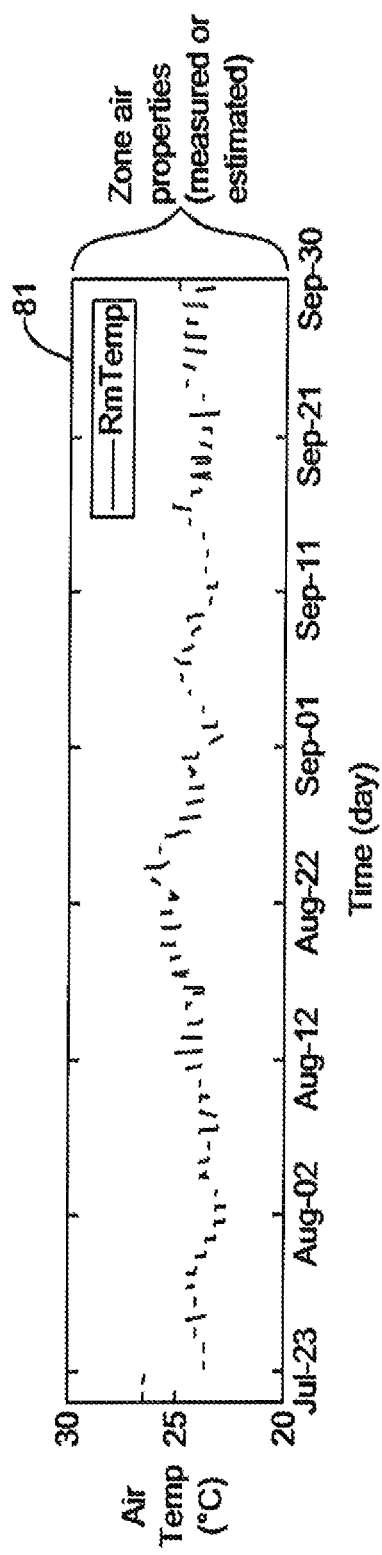
FIGS. 11, 12, 13 and 14 are graphs of data showing zone air properties of temperature, relative humidity, air speed and predicted mean vote trend, respectively, over several months.
Figure 12:
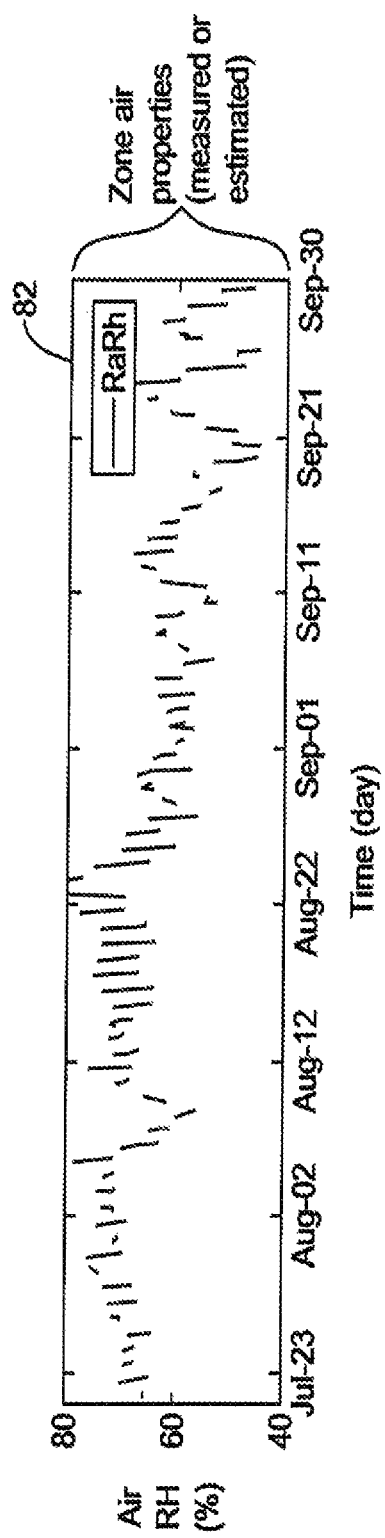
Figure 13:
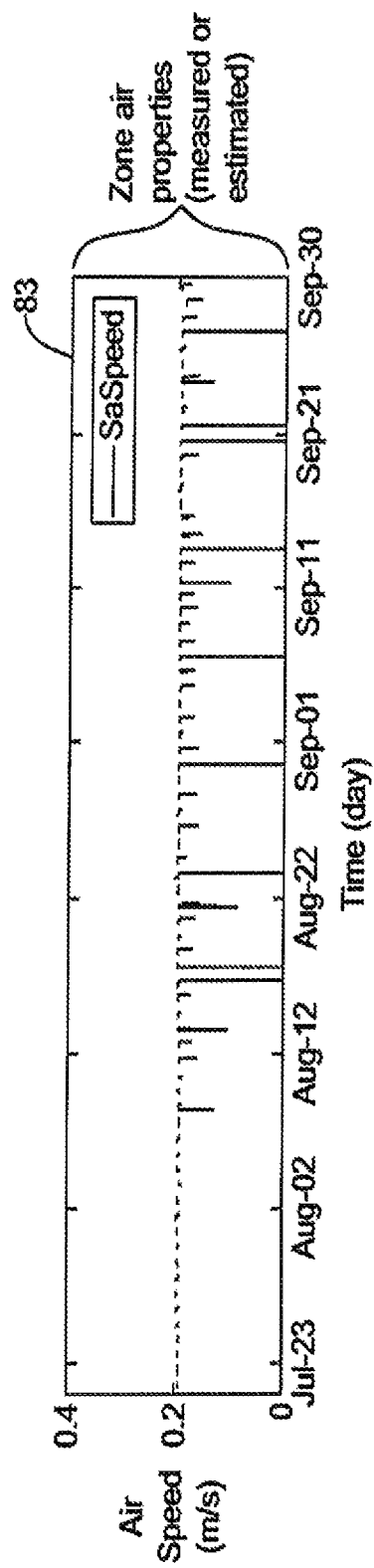

FIGS. 11, 12 and 13 show zone air properties over, for example, several months of data. FIG. 11 is a graph 81 of room air temperature (degrees C.) versus days from July 23 through September 30. FIG. 12 is a graph 82 of return air relative humidity (percent) versus the same period of time as graph 81. FIG. 13 is a graph 83 of supply air speed (m/s) versus the same period of time as graph 81.

Figure 14:
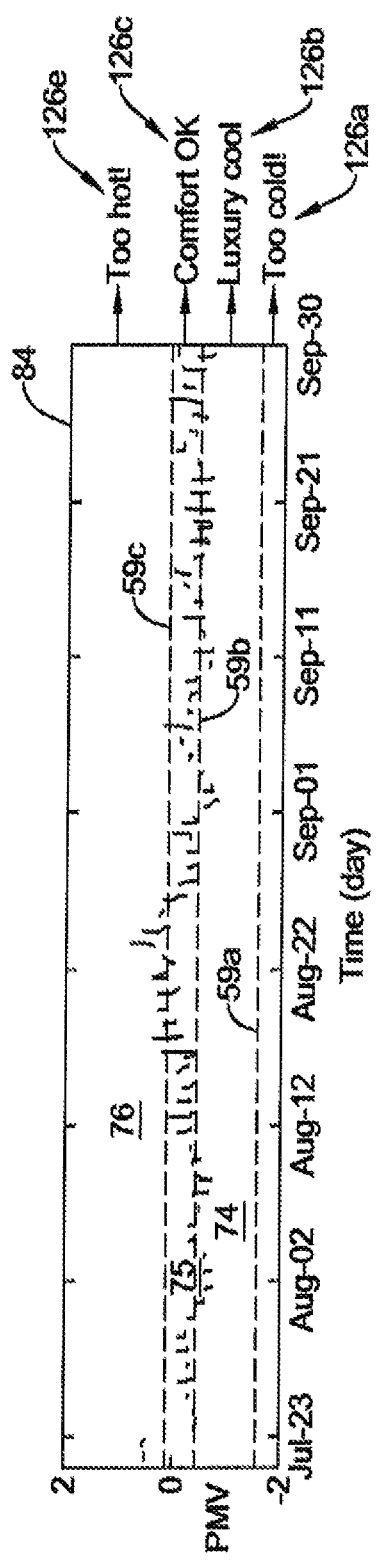

FIG. 14 is a graph 84 of PMV versus the same period of time as graph 81. Graph 84 shows a PMV trend which may be based on data of FIGS. 11-13. Line 59c corresponds to the PMV threshold $P_{high}$ whose value is 0 in this particular case. Line 59c divides the too hot category at the top from the comfort OK category toward the bottom. Line 59b corresponds to the PMV threshold $P_{OK}$ whose value is −0.5 in this particular case. Line 59b divides the comfort OK category at the top from the luxury cool category toward the bottom. Line 59a corresponds to the PMV threshold $P_{low}$ whose value is −1.6 in this particular case. Line 59a divides the luxury cool category toward the top from the too cold category toward the bottom. The data plots of sections 74, 75 and 76 also represent the luxury cool, comfort OK and the too hot categories, respectively. The trend data 74 (i.e., data between line 59a and 59b) correspond to data 74 of FIGS. 8, 9 and 10 that belong to the luxury cool comfort category 126b. The trend data 75 (i.e., data between line 59b and 59c) correspond to data 75 of FIGS. 8, 9 and 10 that belong to the comfort OK comfort category 126c. The trend data 76 (i.e., data above line 59c) correspond to data 76 of FIGS. 8, 9 and 10 that belong to the too hot comfort category 126e.

FIGS. 7-16 and FIGS. 18-21 reveal various visualizations of long term observations of thermal comfort in the plots where individual datum measurements were made. Color coding may be used to more explicitly indicate how the thermal comfort level can be met during an observed period.

Figure 15:
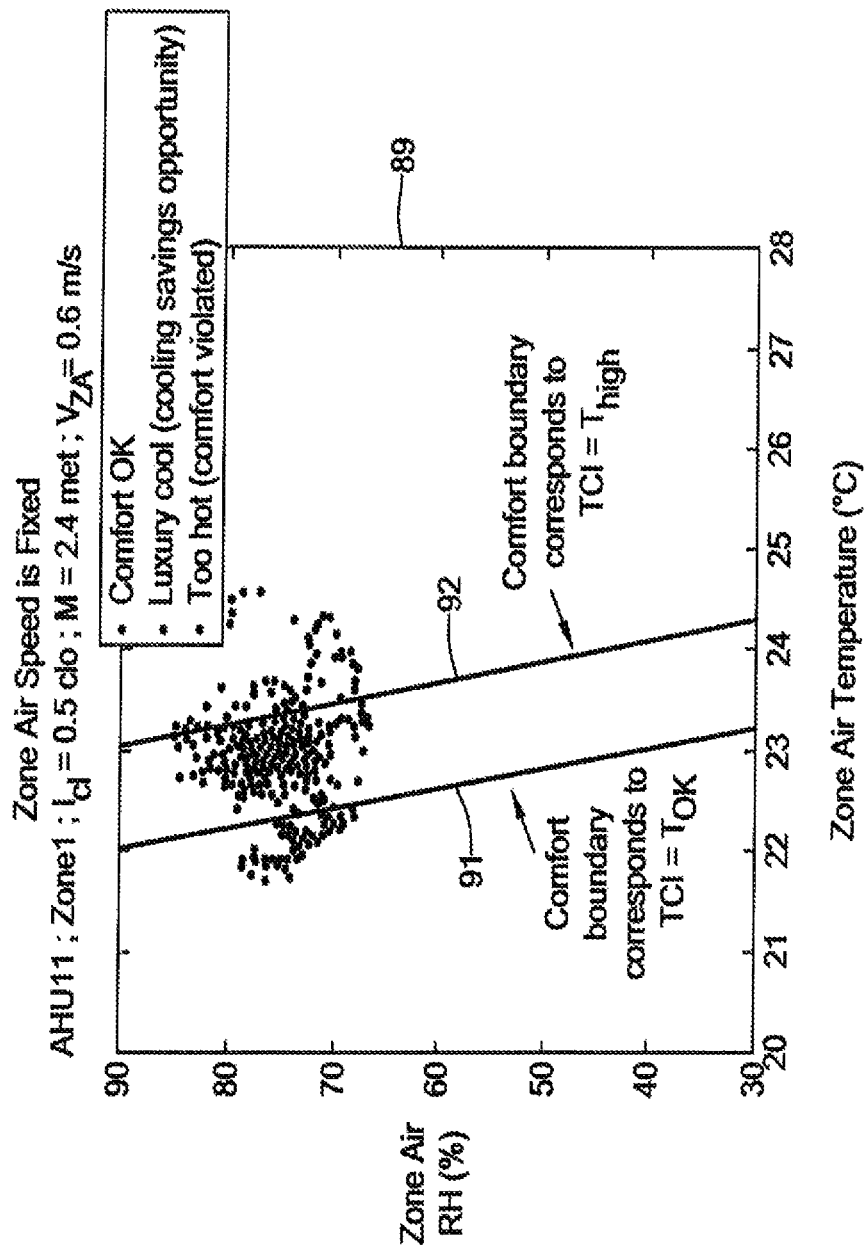
FIG. 15 is a graph showing an illustrative example data plot of zone air relative humidity versus zone air temperature with a fixed air speed and having thermal comfort level boundaries.

FIG. 15 is a graph 89 of an example case showing thermal comfort boundaries 91 and 92 which correspond to TCI thresholds of $T_{OK}$ (symbol 24b of FIG. 5a) and $T_{high}$ (symbol 24c of FIG. 5a), respectively. The graph shows zone air relative humidity (percent) versus zone air temperature (degrees C.). The zone air speed is fixed for graph 89. The data to the left of boundary 91 show thermal comfort to be luxury cool (cooling savings opportunity) and the data of the right of boundary 92 show comfort to be too hot (comfort violated). The data between boundaries 91 and 92 reveal comfort OK. Comfort boundary 92 corresponds to the TCI=$T_{high}$, which may be represented by PMV=0.84 where 80 percent of the people are satisfied according to Chapter 8 "Thermal Comfort" from "ASHRAE Handbook—Fundamentals", 2005, American Society of Heating, Refrigerating and Air-Conditioning Engineers, Inc. (ASHRAE), ISBN 1-931862-71-0. Other metrics for graph 89 may include $I_{cl}$ of e.g. 0.5 clo (clothing level), M of e.g. 2.4 met (metabolic activity) and $V_{ZA}$ of e.g. 0.6 m/s (zone air speed).

Figure 16:
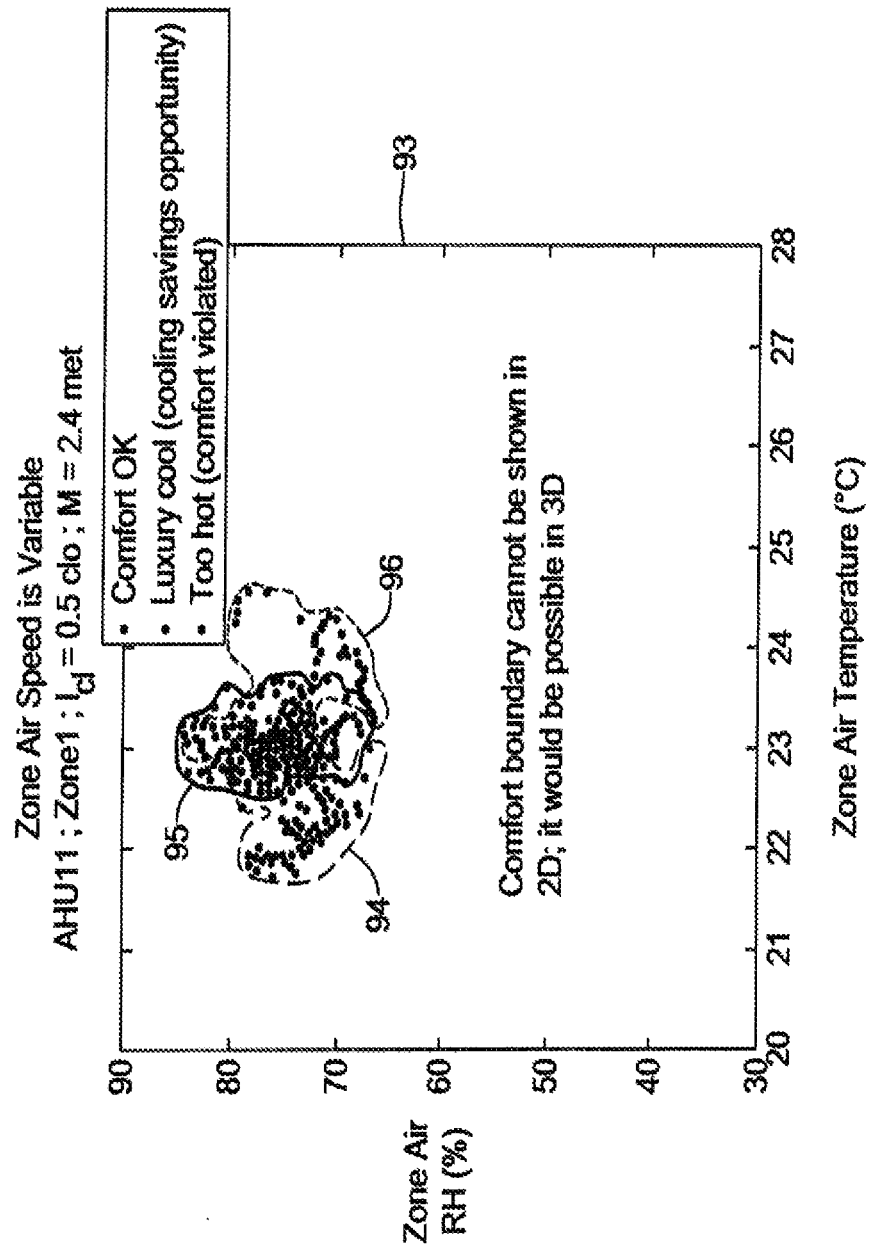
FIG. 16 is a graph showing an illustrative example data plot of zone air relative humidity versus zone air temperature with a variable air speed and having no thermal comfort level boundaries.

FIG. 16 is a graph 93 where zone air speed is variable. The graph is plotted in terms of zone air relative humidity (percent) versus zone air temperature (degrees C.). Other metrics for graph 93 may incorporate $I_{cl}$ of e.g. 0.5 clo and M of e.g. 2.4 met. Dashed line 94 may encompass luxury cool (cooling savings opportunity) data. Solid line 95 may encompass comfort OK data. Dotted line 96 may encompass too hot (comfort violated) data. The comfort OK boundary or boundaries cannot necessarily be displayed in 2D but may be displayed in a 3D graph with variable zone air speed.

Figure 17:
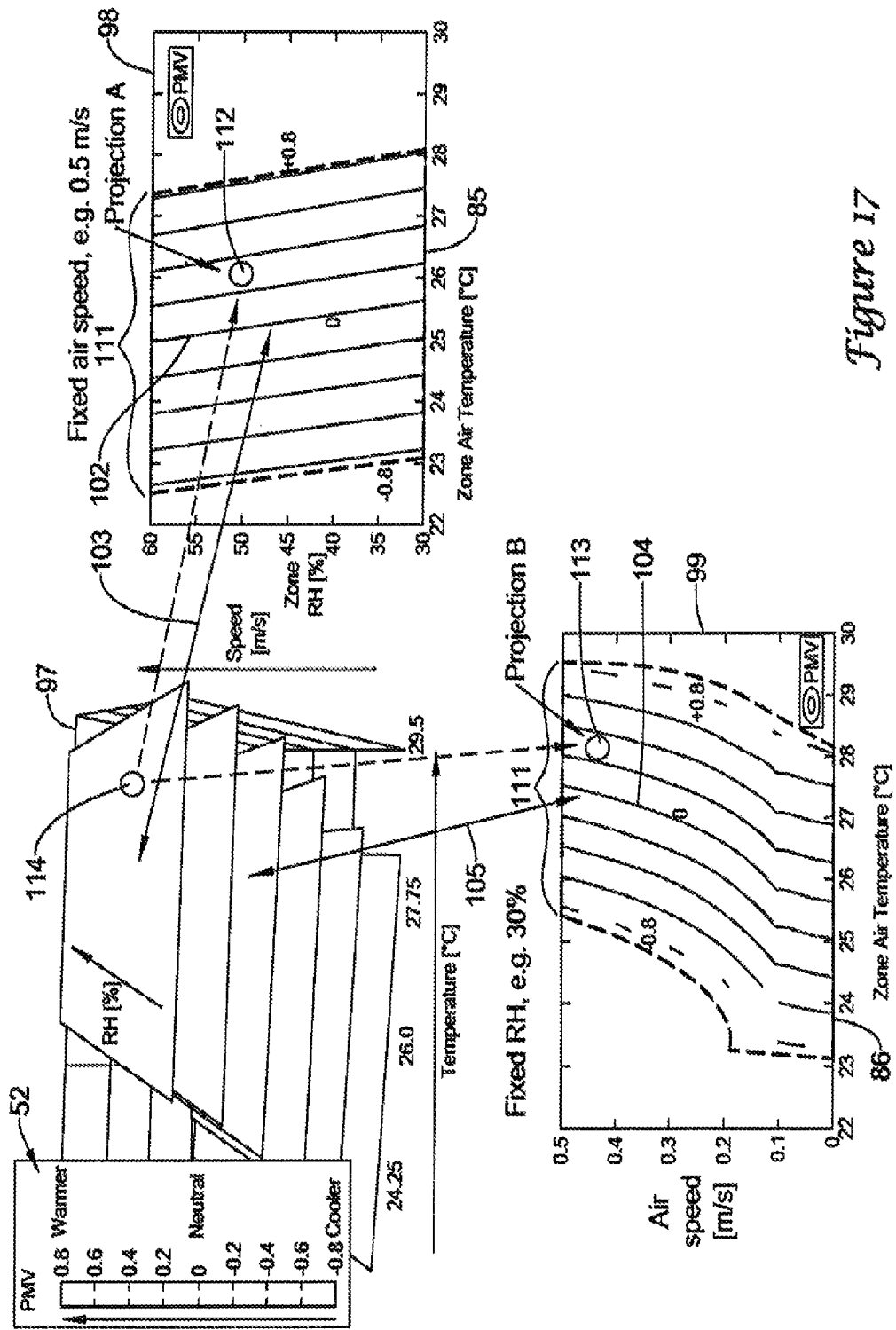
FIG. 17 is a diagram of an example 3D predicted mean vote comfort level graph with slices from it for fixed air speed and fixed air relative humidity as shown in respective 2D graphs.

FIG. 17 reveals a combination of graphs 97, 98 and 99 for showing PMV slices for fixed air speed and fixed relative humidity. Graph 97 is 3D with air speed (m/s), temperature and relative humidity, on the y, x and z axes, respectively. The PMV thermal comfort levels may be shown with shading (or color as applicable), with a PMV scale 52 for measurement. Graph 98 shows zone relative humidity (percent) versus zone air temperature (degrees C.) for a fixed air speed of, e.g., 0.5 m/s. A line 102 may represent a PMV of zero with lines 111 to the right indicating warmer comfort and the lines 111 to the left indicating cooler comfort. A close neighborhood of line 102 may represent a comfort OK. Line 103 with arrows may reveal corresponding values of graphs 97 and 98. Graph 99 shows air speed (m/s) versus zone air temperature (degrees C.) for a fixed relative humidity of, e.g., 30 percent. Line 104 may represent a PMV of zero with lines 111 to the right indicating warmer comfort and lines 111 to the left indicating cooler comfort. Line 104 may represent a comfort OK. Line 105 with arrows may reveal corresponding values of graphs 97 and 99.

Graph 97 shows in 3D an acceptable comfort space in view of temperature, relative humidity and air speed. The 2D projections in the form of graphs 98 and 99 may be relevant when some variable is not necessarily available.

PMV subspace may be a subset of PMV space. Comfort boundary lines of each PMV subspace may depend on which part of the PMV space is extracted. PMV subspace type A (symbol 85) of graph 98 may be a part of PMV space corresponding to fixed speed; it is in this particular example of 0.5 m/s. Having a different value of fixed air speed (e.g., 0.2 m/s) may result in different positions of comfort boundary lines in the zone temperature/RH plane. Types A and B are noted herein.

PMV subspace type B (symbol 86), graph 99, may be a part of PMV space corresponding to fixed relative humidity; in this particular example of 30%. Having a different value of fixed air speed (e.g., 60%) may result in different positions of comfort boundary lines in the zone temperature/speed plane. Projections A and B may be from 3D PMV space to 2D PMV subspaces.

FIG. 17 is about the current thermal comfort visualization (type A). When there are available sensors for zone air temperature, zone relative humidity and zone air speed, monitoring can be performed in PMV space (3D) shown in top-left part, graph 97, of FIG. 17. Circle or dot 114 may indicate current properties of zone air, e.g., during a cooling season.

When there are available sensors for zone air temperature and zone relative humidity, monitoring may be performed in PMV subspace type A shown in top-right part, graph 98, of FIG. 17. Zone air speed should be estimated and/or approximated by a constant value corresponding to the specific zone. Different values of zone air speed may result in different positions of thermal comfort boundary lines. A circle or dot 112 represents the current zone air properties in PMV subspace type A.

When there are available sensors for zone air temperature and zone air speed, monitoring may be performed in PMV subspace type B shown in bottom-left part, graph 99, of FIG. 17. Zone air relative humidity should be estimated and/or approximated by a constant value corresponding to the specific zone. Different values of zone air relative humidity may result in different positions of thermal comfort boundary lines. Circle or dot 113 represents the current zone air properties in PMV subspace type B. Circles or dots 112 and 113 may be 2D projections of a 3D representation of current properties of zone air as indicated by corresponding circle or dot 114.

Figure 18:
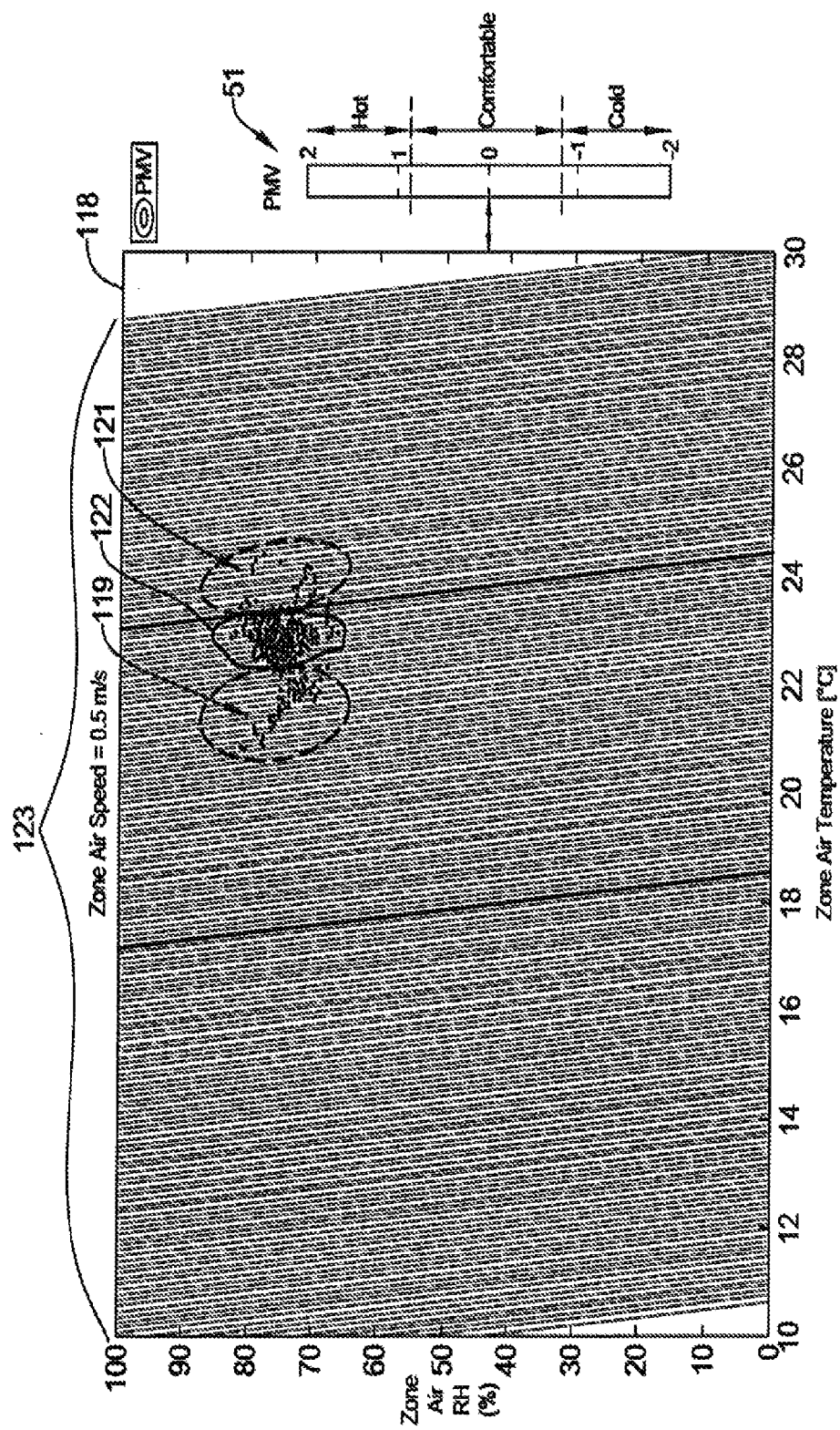
FIG. 18 is an illustrative graph revealing a thermal comfort level index space with a zone relative humidity versus zone air temperature plot and at a zone air speed of about 0.5 meter per second.

Graph 118 of FIG. 18 reveals a PMV space in a zone relative humidity (percent) versus zone air temperature (degrees C.) with at a zone air speed of about 0.5 m/s. Graph 118 may have lines 123 with an alternative color coding or with alternative to color coding. Black dots may show an observed current thermal comfort level (i.e., real data) for a cooling season. The black dots in an area within a dashed line border 119 may indicate a wasting of energy and that cooling should be decreased to get savings in electricity. The black dots in the area within a dashed line border 121 may indicate a violation of thermal comfort such that cooling should be increased to satisfy occupants of the zone. The dots in the area within a solid line border 122 may be regarded as within comfort OK. By comparing observed and required comfort levels, the performance of the zone HVAC may be assessed. The data for graph 118 may be taken relative to an activity level of 2.4 met (e.g., dancing) with a clothing insulation of 0.5 clo (e.g., summer dress). Color or shade of the lines 123 may be matched up against a PMV color or shade scale 51 to determine a PMV of one or more lines 123.

Figure 19:
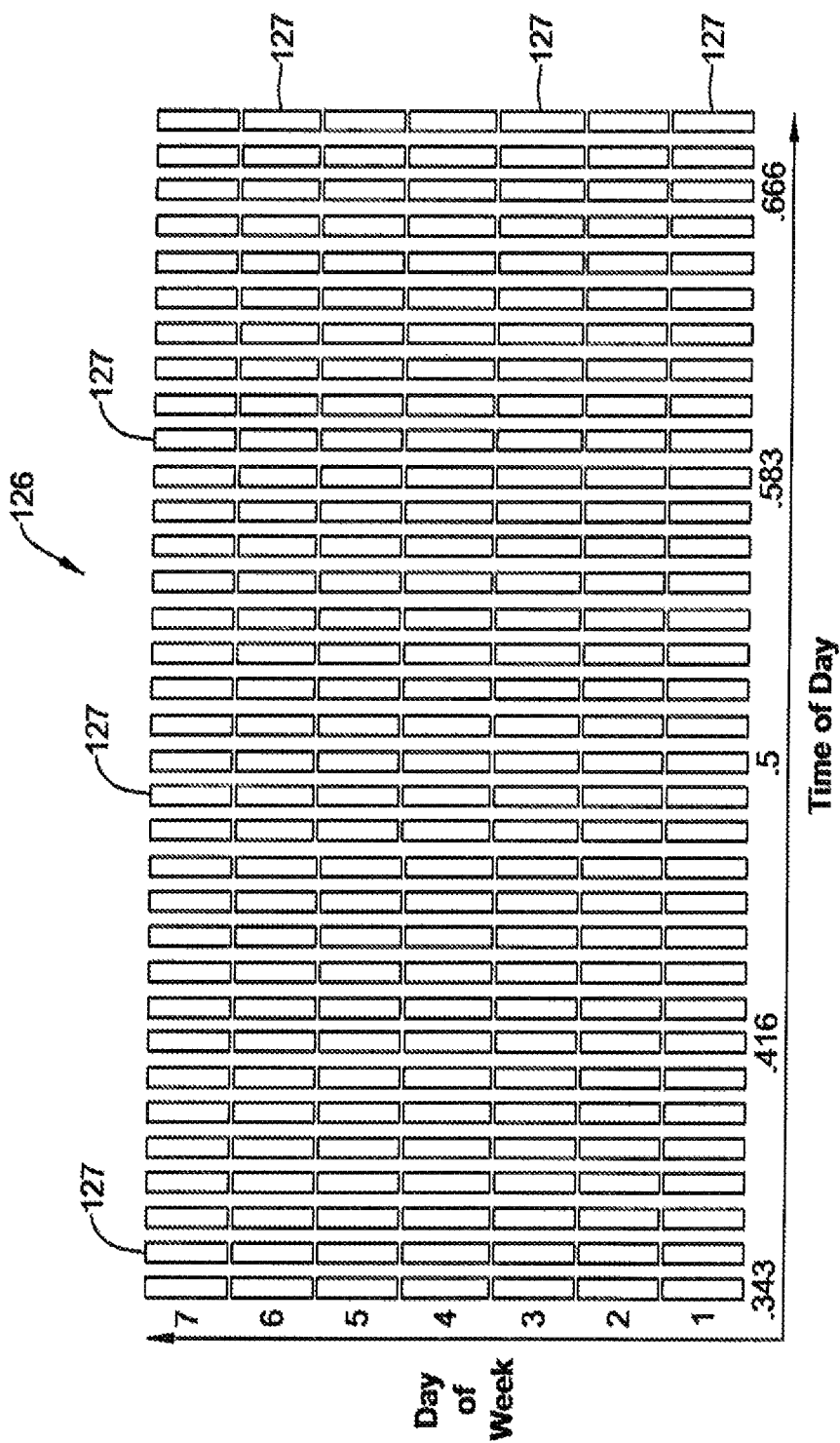
FIG. 19 is a diagram indicating thermal comfort levels with coded rectangles with each day of the week versus a time of the respective day associated with the respective rectangles.
Figure 20:
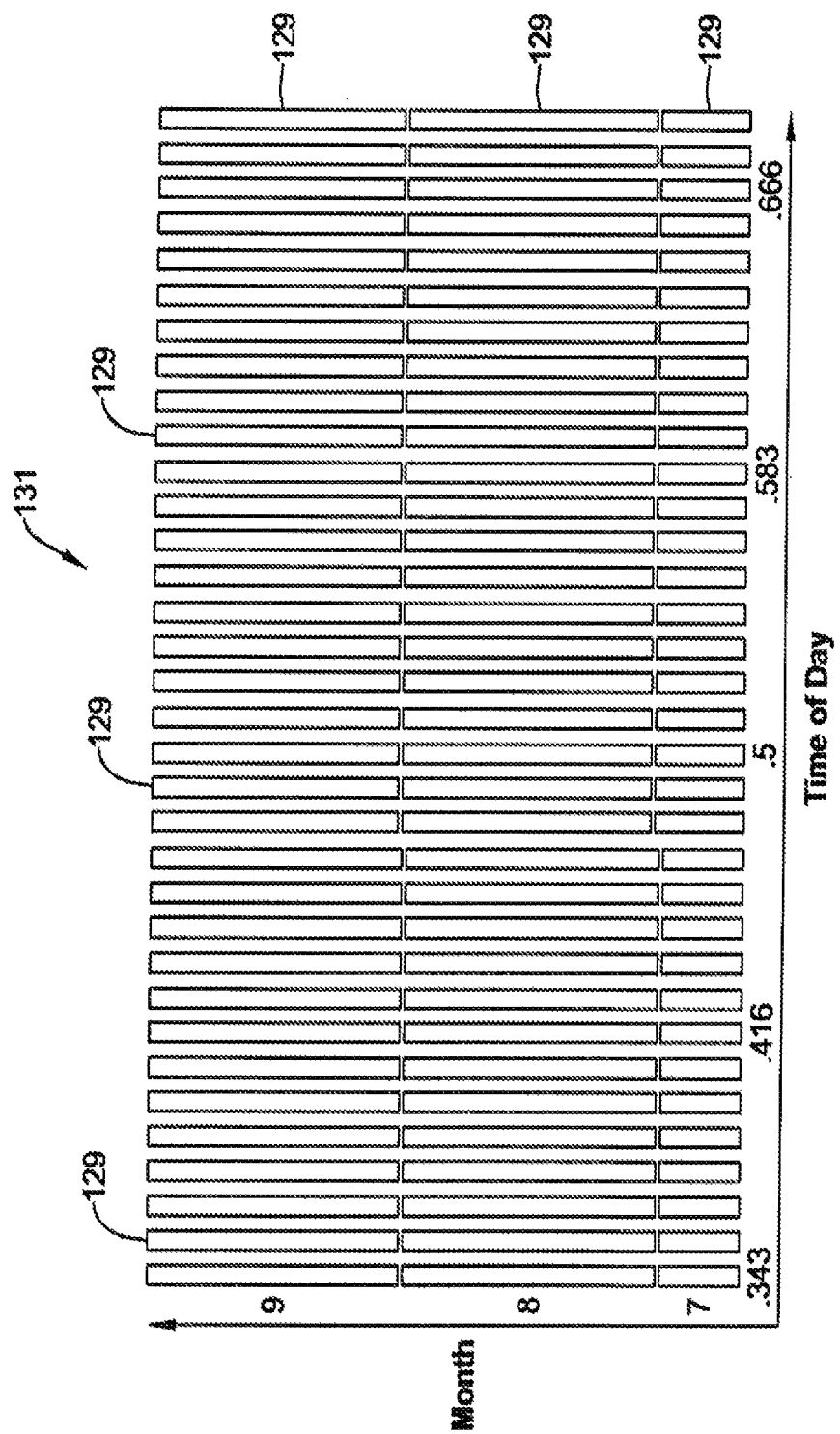
FIG. 20 is a diagram having rectangles indicating thermal comfort levels for various months versus a time of day.

FIG. 19 shows a graph 126 indicating a thermal comfort level with a rectangle 127 having a day of the week and the time of the respective day associated with the rectangle. Each rectangle 127 may be colored according to a color from chart 125 of FIG. 5b to indicate a thermal comfort level category. Alternatively, a rectangle 127 may be colored according to a color from chart 51 or chart 52 of FIG. 3 to indicate a thermal comfort index (e.g., predicted mean vote). The colors may be substituted with various shadings, line designs or dot arrangements to indicate a corresponding thermal comfort level. The same kinds of designations for various comfort levels may be utilized for rectangles 129 of a graph 131 in FIG. 20, and for rectangles 132 of graph 133 in FIG. 21. FIG. 20 having graph 131 may have rectangles 129 revealing thermal comfort levels for various months for each time of the respective day. Graph 133 of FIG. 21 may have rectangles 132 revealing comfort levels for various months for each day of the respective week.

Figure 22:
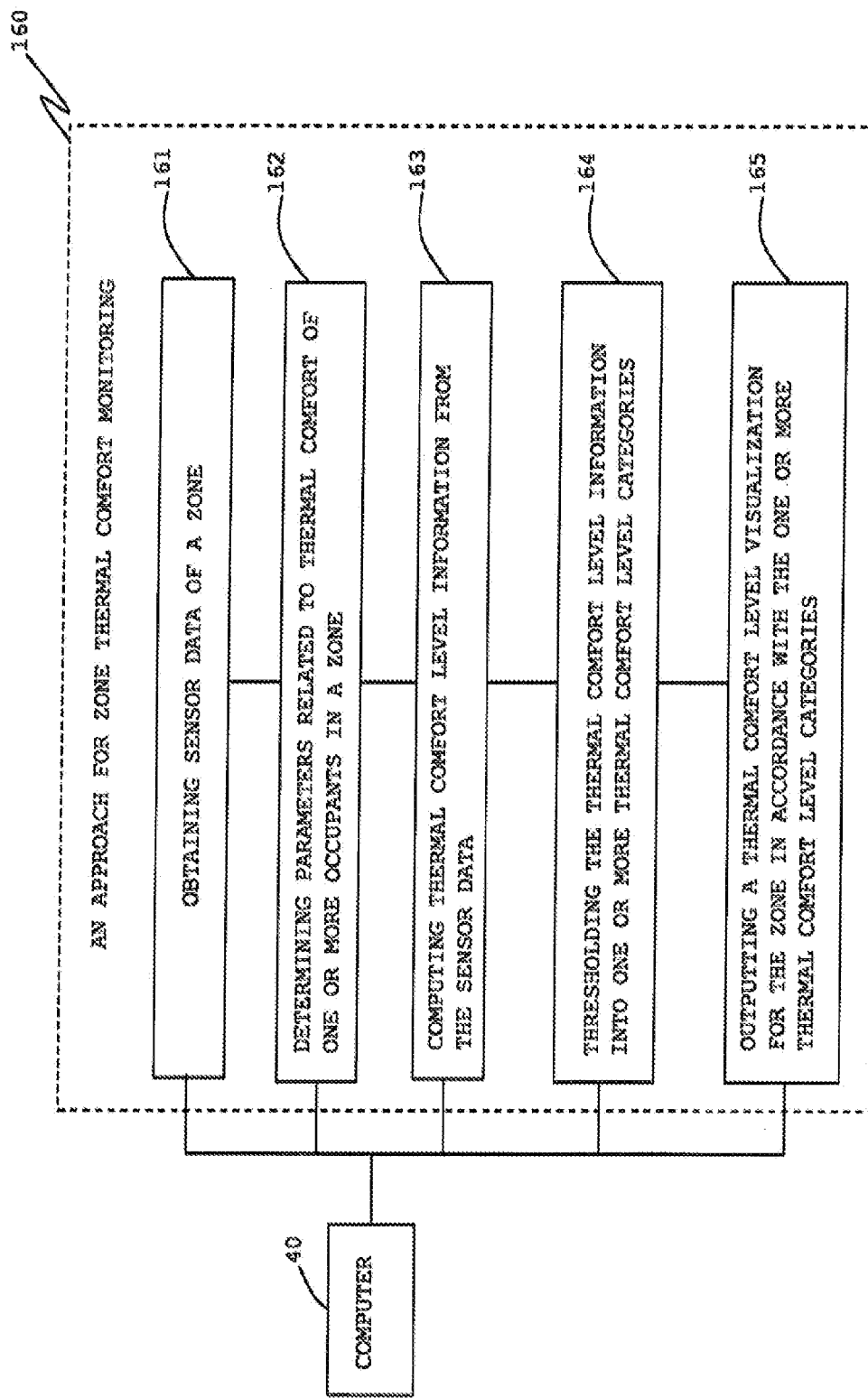
FIG. 22 is a diagram of an approach for zone thermal comfort monitoring.

To recap, as shown in FIG. 22, an approach 160 for zone thermal comfort monitoring may incorporate obtaining sensor data of a zone, as in symbol 161, determining parameters related to thermal comfort of one or more occupants in a zone, as in symbol 162, computing thermal comfort level information from the sensor data, as in symbol 163, thresholding the thermal comfort level information into one or more thermal comfort level categories, as in symbol 164, and outputting a thermal comfort level visualization, as in symbol 165, for the zone in accordance with the one or more thermal comfort level categories. The thermal comfort level information may be quantified in terms of a thermal comfort level index. A quantification of the thermal comfort level index may identify each of the one or more thermal comfort level categories with a quantitative measure. A computer 40 along with associated software may be used to effect one or more portions and/or items 161-165 of approach 160, and one or more portions and/or items pertinent to items 161-165.

The thermal comfort level index may incorporate an index selected from a group consisting of a predicted mean vote, thermal comfort observation, heat index, thermal sensation index, discomfort index, and predicted percent dissatisfied. The sensor data may incorporate air temperature, air relative humidity, air speed, and/or radiant temperature and/or any zone sensor relevant to occupants' thermal comfort.

The thermal comfort level information may be further computed from parameters of one or more occupants. The parameters of one or more occupants may incorporate metabolic rate and/or clothing level. The thermal comfort level visualization for the zone may be a plot over time of temperature, relative humidity and air speed of the zone.

The thermal comfort index may be greater than or equal to Tlow and less than TOK for luxury cool during a cooling season. The thermal comfort index may be greater than TOK and less than or equal to Thigh for luxury warm during a heating season. Tlow≤TOK≤Thigh may be true for the cooling season and the heating season. The thermal comfort index may be kept between TOK and Thigh to save energy for cooling during the cooling season. The thermal comfort index may be kept between TOK and Tlow to save energy on heating during the heating season.

If the thermal comfort index is between $T_{low}$ and $T_{high}$, then most of the occupants may be satisfied with their thermal comfort level. If the thermal comfort index exceeds $T_{high}$, then the comfort level may be violated as too hot. If the thermal comfort index is less than $T_{low}$, then the comfort level may be violated as too cold.

The thermal comfort level visualization for the zone may be plotted in a 3-D graph with relative humidity plotted on an x axis, temperature plotted on a y axis, air speed plotted on a z axis, and the one or more comfort levels indicated by a graphic differentiation. The thermal comfort level visualization may be plotted as thermal comfort levels indicated at a day of the week versus time of day, at a month versus time of the day and/or at a month versus day of the week. The thermal comfort level visualization may be displayed on a dashboard.

Figure 23:
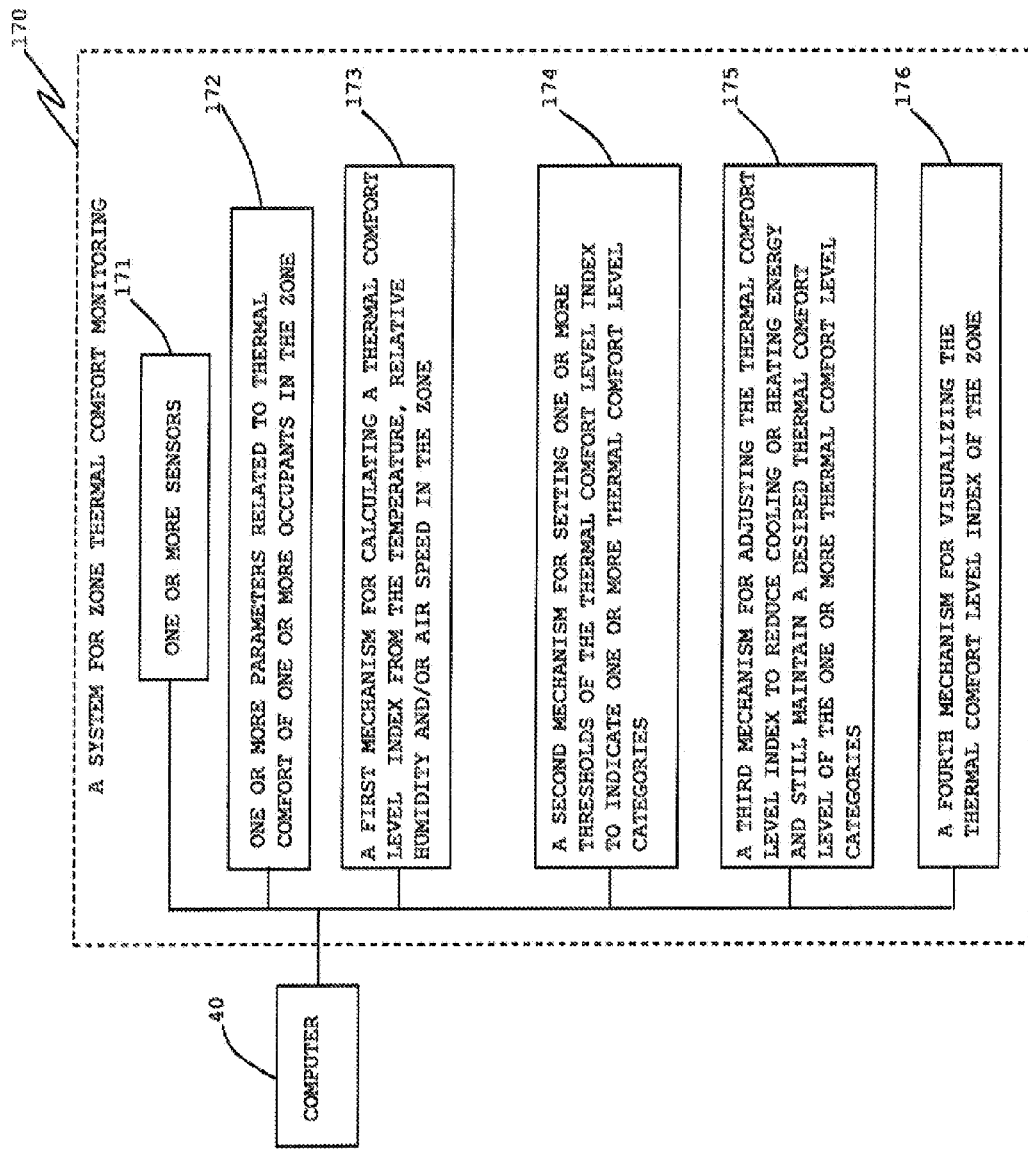
FIG. 23 is a diagram of a system for zone thermal comfort monitoring.

In a diagram of FIG. 23, a system 170, for zone thermal comfort monitoring, may incorporate one or more sensors 171 for determining temperature, relative humidity and air speed in a zone, one or more parameters 172 related to thermal comfort of one or more occupants in the zone, a first mechanism 173 for calculating a thermal comfort level index from the temperature, relative humidity and/or air speed in the zone, a second mechanism 174 for setting one or more thresholds of the thermal comfort level index to indicate one or more thermal comfort level categories, and a third mechanism 175 for adjusting the thermal comfort level index to reduce cooling or heating energy and still maintain a desired thermal comfort level of the one or more thermal comfort level categories.

Each of the one or more thermal comfort levels may be represented by a numerical value that is distinct relative to numerical values representing other comfort levels. The system may further incorporate an occupant parameter indicator connected to the first mechanism 173. The occupant parameter indicator may provide metabolic rate and/or clothing level of one or more occupants in the zone. The first mechanism 173 may further calculate the thermal comfort level from the metabolic rate and/or clothing level.

The system 170 may further incorporate a fourth mechanism 176 for visualizing the thermal comfort level index of the zone. The thermal comfort level index may be adjusted to reduce energy used for heating or cooling without violation of thermal comfort of the one or more occupants. A computer 40 may be a part of and/or connected to one or more of components 171-176 of system 170, and items and/or activity pertinent to components 171-176.

Figure 24:
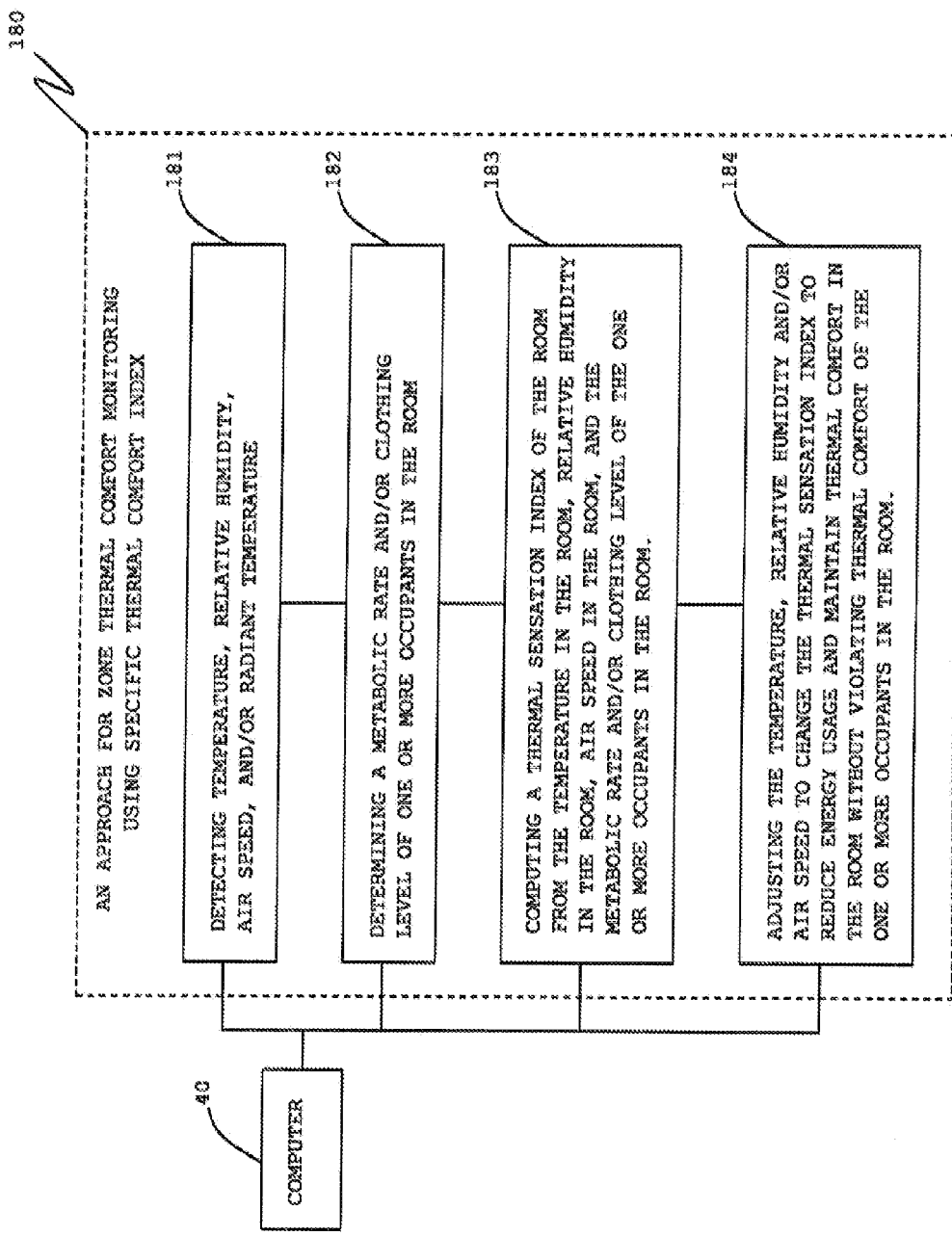
FIG. 24 is a diagram of an approach for zone thermal comfort monitoring using a specific thermal comfort index.

In a diagram of FIG. 24, an approach 180 for zone thermal comfort monitoring using specific thermal comfort index may incorporate, in symbol 181, detecting temperature, relative humidity, air speed, and/or radiant temperature, in symbol 182, determining a metabolic rate and/or clothing level of one or more occupants in the room, and, in symbol 183, computing a thermal sensation index of the room from the temperature in the room, relative humidity in the room, air speed in the room, and the metabolic rate and/or clothing level of the one or more occupants in the room.

The approach may further incorporate, in symbol 184, adjusting the temperature, relative humidity and/or air speed to change the thermal sensation index to reduce energy usage and maintain thermal comfort in the room without violating thermal comfort of the one or more occupants in the room. A computer 40 along with associated software may be used to effect one or more portions and/or items 181-184 of approach 180, and one or more portions and/or items pertinent to items 181-184.

Figure 4:
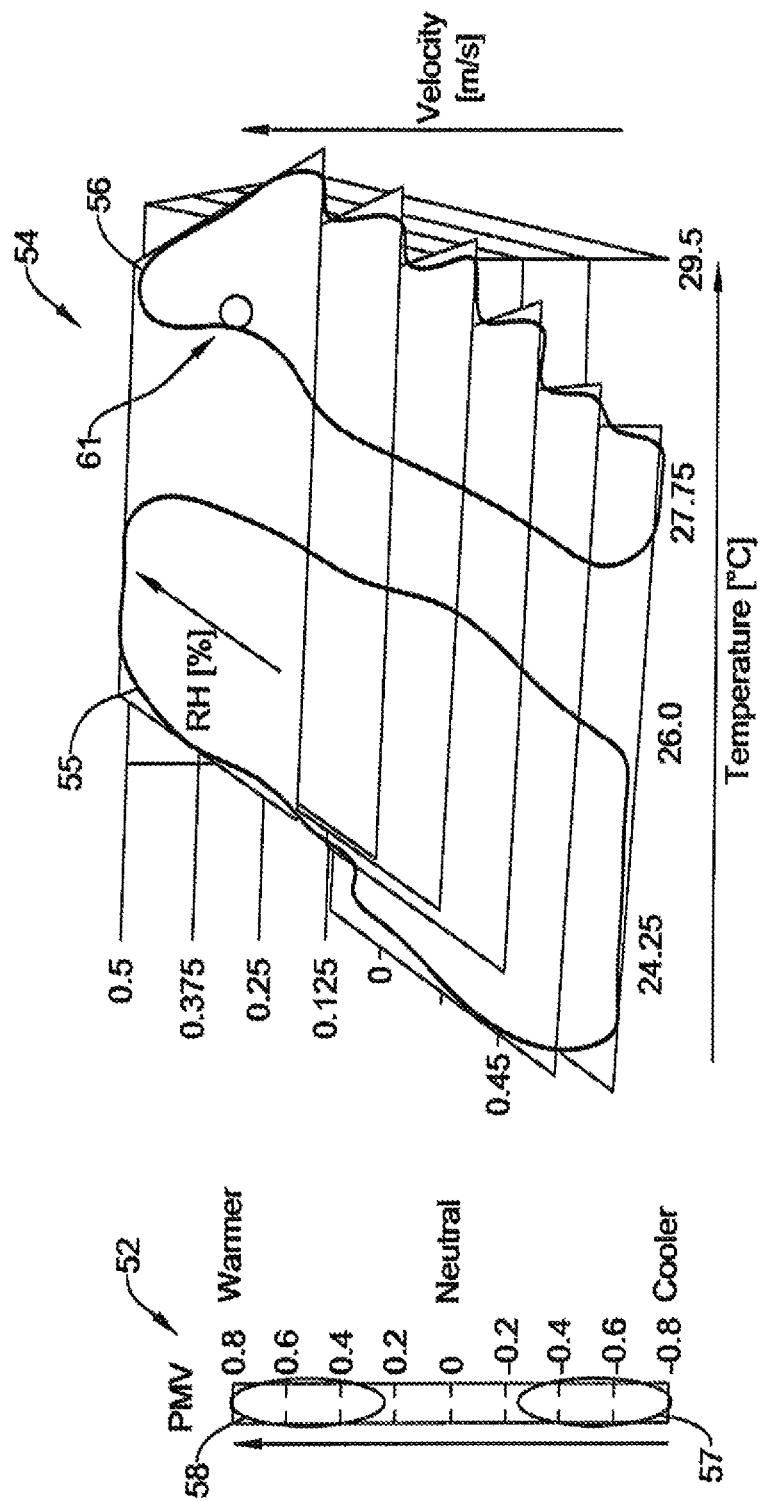
FIG. 4 is a diagram of a 3D graph illustrative example of a visualization of a predicted mean vote space with relative humidity, temperature and air speed axes of data.
Figure 21:
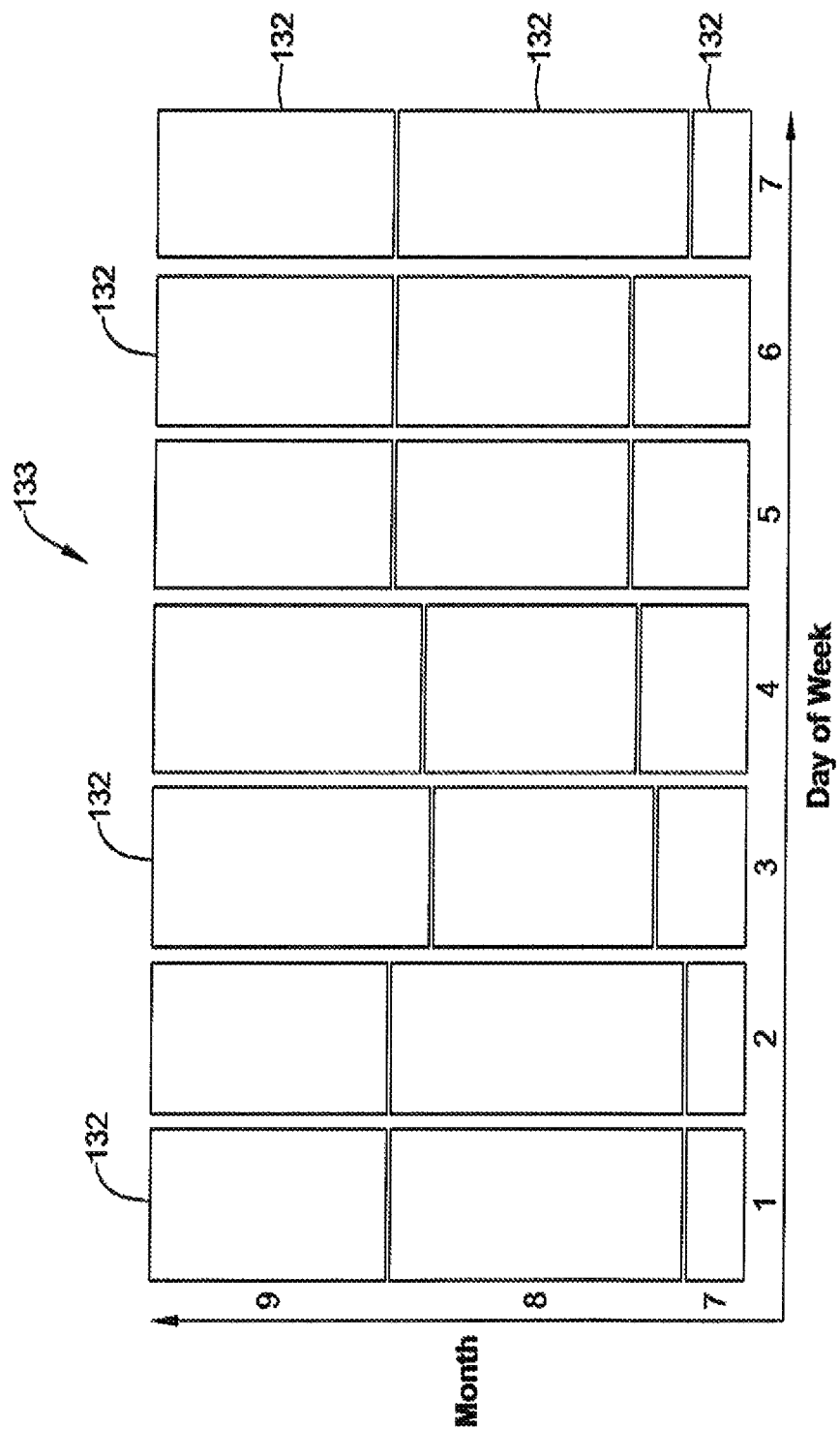
FIG. 21 is a diagram having rectangles indicating thermal comfort levels for various months for each day of the week.

In sum, there may be various types of plots for visualizing of a thermal comfort level. They may incorporate: a trend plot, as shown in FIGS. 11-14, of a thermal comfort index visualization with associated thermal comfort index thresholds; a psychrometric chart with thermal comfort information, i.e., thermal comfort level categories used as color coding, as shown in FIG. 9; a 2D scatter plot of zone air relative humidity vs. zone air temperature with thermal comfort information and comfort boundaries, as shown in FIGS. 7, 15, 16 and 18; a 2D scatter plot of zone air speed vs. zone air temperature with thermal comfort information, as shown in FIG. 10; a 3D visualization of thermal comfort index space and current zone air properties, as shown in FIG. 4; mosaic plots with various time variables (e.g., time of day, hour of day, time of week, day of week, day of month, month, year, an so forth) on x- and y-axes, with thermal comfort level categories used as color coding, as shown in FIGS. 19-21; and a pie chart with thermal comfort level categories summarized over a period of time, as shown in FIG. 8.

In the present specification, some of the matter may be of a hypothetical or prophetic nature although stated in another manner or tense.

Although the present system has been described with respect to at least one illustrative example, many variations and modifications will become apparent to those skilled in the art upon reading the specification. It is therefore the intention that the appended claims be interpreted as broadly as possible in view of the prior art to include all such variations and modifications.

What is claimed is:

1. A method for zone thermal comfort management comprising:

obtaining sensor data of a zone, wherein the sensor data comprise: air temperature, air relative humidity, and air speed of the zone;

computing thermal comfort level information based on, at least the air temperature, the air relative humidity, and the air speed of the zone;

quantifying the thermal comfort level information in terms of a thermal comfort level index;

thresholding the quantified thermal comfort level information into a plurality of thermal comfort level categories, wherein:

the plurality of thermal comfort level categories comprise at least a comfort ok category, a cooling and/or heating savings opportunity category, and a comfort violated category;

the comfort ok category includes index values, in terms of the thermal comfort level index, that meet a rule of thermal comfort established for one or more occupants of the zone;

the cooling and/or heating savings opportunity category includes index values, in terms of the thermal comfort level index, that meet the rule established for the one or more occupants of the zone and that provide greater energy savings than the comfort ok category; and the comfort violated category includes index values, in terms of the thermal comfort level index, that do not meet the rule established for the one or more occupants of the zone;

processing a request for a thermal comfort level;

providing at least one of the index values that are included in the comfort ok category, or the cooling and/or heating savings opportunity category that meet the request;

determining a new thermal comfort index setpoint based on the at least one of the index values; and adjusting a system setpoint based on the new thermal comfort index setpoint.

2. The method of claim 1, wherein the thermal comfort level index comprises an index selected from a group consisting of a predicted mean vote, thermal comfort observation, heat index, thermal sensation index, discomfort index, and predicted percent dissatisfied.

3. The method of claim 1, wherein the thermal comfort level information is further computed from parameters of one or more occupants.

4. The method of claim 3, wherein the parameters of one or more occupants comprise metabolic rate and/or clothing level.

5. The method of claim 1, further comprising the step of outputting a thermal comfort level visualization for the zone in accordance with the one or more thermal comfort level categories.

6. The method of claim 5, wherein the thermal comfort level visualization for the zone comprises a plot over time of temperature, relative humidity and air speed of the zone.

7. The method of claim 6, wherein the thermal comfort level visualization for the zone is plotted in a 3-D graph with relative humidity plotted on an x axis, temperature plotted on a y axis, air speed plotted on a z axis, and the one or more thermal comfort level categories indicated by a graphic differentiation.

8. The method of claim 5, wherein the thermal comfort level visualization is plotted as thermal comfort levels indicated at a day of a week versus time of day, at a month versus time of the day and/or at a month versus day of a week.

9. The method of claim 5, wherein the thermal comfort level visualization is displayed on a dashboard.

10. The method of claim 2, wherein:

the thermal comfort index is greater than or equal to $T_{low}$ and less than $T_{OK}$ for luxury cool during a cooling season; and the thermal comfort index is greater than $T_{OK}$ and less than or equal to $T_{high}$ for luxury warm during a heating season.

11. The method of claim 10, wherein $T_{low} < T_{OK} < T_{high}$ is true for the cooling season and the heating season.

12. The method of claim 10, wherein:
the thermal comfort index is kept between $T_{OK}$ and $T_{high}$ to save energy for cooling during the cooling season; and
the thermal comfort index is kept between $T_{OK}$ and $T_{low}$ to save energy on heating during the heating season.

13. The method of claim 12, wherein:
if the thermal comfort index is between $T_{low}$ and $T_{high}$, then most of a number of occupants are satisfied with their thermal comfort level;
if the thermal comfort index exceeds $T_{high}$, then the thermal comfort level is violated as too hot; and
if the thermal comfort index is less than $T_{low}$, then the thermal comfort level is violated as too cold.

14. A system for zone thermal comfort management comprising:
one or more sensors for determining air temperature, air relative humidity and air speed of a zone;
a first mechanism configured for calculating thermal comfort level information based on at least the air temperature, air relative humidity and the air speed of the zone, the first mechanism further configured for quantifying the thermal comfort level information in terms of a thermal comfort level index;
a second mechanism configured for setting thresholds of the thermal comfort level information to indicate a plurality of thermal comfort level categories, wherein:
the plurality of thermal comfort level categories comprise at least a comfort ok category, a cooling and/or heating savings opportunity category, and a comfort violated category;
the comfort ok category includes index values, in terms of the thermal comfort level index, that meet a rule of thermal comfort established for one or more occupants of the zone;
the cooling and/or heating savings opportunity category includes index values, in terms of the thermal comfort level index, that meet the rule established for the one or more occupants of the zone and that provide greater energy savings than the comfort ok category; and
the comfort violated category includes index values, in terms of the thermal comfort level index, that do not meet the rule established for the one or more occupants of the zone; and
a third mechanism configured for:
processing a request for a thermal comfort level;
providing at least one of the index values that are included in the comfort ok category, or the cooling and/or heating savings opportunity category that meet the request;
determining a new thermal comfort index setpoint based on the at least one of the index values; and
adjusting a system setpoint based on the new thermal comfort index setpoint.

15. The system of claim 14, further comprising:
an occupant parameter indicator connected to the first mechanism; and
wherein:
the occupant parameter indicator provides values describing thermal comfort of occupants in the zone; and
the first mechanism further quantifies the thermal comfort level information in terms of the thermal comfort level index from the values describing thermal comfort of occupants in the zone.

16. The system of claim 15, further comprising:
a fourth mechanism for visualizing the thermal comfort level index of the zone; and
wherein the thermal comfort level index is adjusted to reduce energy used for heating or cooling without violation of thermal comfort of the occupants.

17. The system of claim 16, wherein the fourth mechanism for visualizing the thermal comfort level index of the zone displays a thermal comfort level visualization on a dashboard.

\* \* \* \* \*